United States Patent
Tomizawa

(10) Patent No.: US 8,213,557 B2
(45) Date of Patent: Jul. 3, 2012

(54) FILTERING APPARATUS AND DIGITAL BROADCAST RECEIVING APPARATUS

(75) Inventor: Kenji Tomizawa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1132 days.

(21) Appl. No.: 11/955,178

(22) Filed: Dec. 12, 2007

(65) Prior Publication Data

US 2008/0144747 A1    Jun. 19, 2008

(30) Foreign Application Priority Data

Dec. 15, 2006    (JP) .................................. 2006-338740

(51) Int. Cl.
    H04B 1/10    (2006.01)
(52) U.S. Cl. ................... 375/350; 375/240.29; 375/316; 375/342; 375/136; 370/232; 370/235; 370/389
(58) Field of Classification Search .................. 375/290, 375/295, 306, 316, 342, 349, 350, 355, 136, 375/147, 229, 240.29; 370/389, 464, 487, 370/232, 235, 392
See application file for complete search history.

(56) References Cited

U.S. PATENT DOCUMENTS

| | | | | |
|---|---|---|---|---|
| 6,091,772 A * | 7/2000 | Anderson et al. | ......... | 375/240.26 |
| 7,088,732 B2 * | 8/2006 | Min | .............................. | 370/428 |
| 7,116,719 B2 | 10/2006 | Hamery et al. | | |
| 7,646,768 B2 * | 1/2010 | Coupe et al. | ................... | 370/389 |
| 2001/0009034 A1 * | 7/2001 | Lee | .................. | 725/39 |
| 2005/0044201 A1 * | 2/2005 | Suzuki et al. | ................. | 709/223 |
| 2005/0180452 A1 * | 8/2005 | Rhee | ............................. | 370/464 |
| 2005/0265337 A1 * | 12/2005 | Tomizawa | .................... | 370/389 |
| 2007/0165676 A1 * | 7/2007 | Kato | ............................. | 370/487 |

FOREIGN PATENT DOCUMENTS

| | | |
|---|---|---|
| JP | 2002-185960 | 6/2002 |
| JP | 2005-333474 | 12/2005 |

* cited by examiner

*Primary Examiner* — Hirdepal Singh
(74) *Attorney, Agent, or Firm* — Turocy & Watson, LLP

(57) ABSTRACT

A filtering apparatus including: first and second filters used to filter inputted packets; a connection information register disposed in correspondence with the first filter; a condition storage portion configured to store a filter condition for identifying a packet associated to the second filter; a reference number register configured to allocate any one of the numbers of the second filters as a reference number for each number of the first filter and to store the reference numbers; and a determination portion configured to determine the number of the second filter to be used to filter packets filtered using the first filter based on the reference number and on a value of the connection information register corresponding to the first filter.

20 Claims, 25 Drawing Sheets

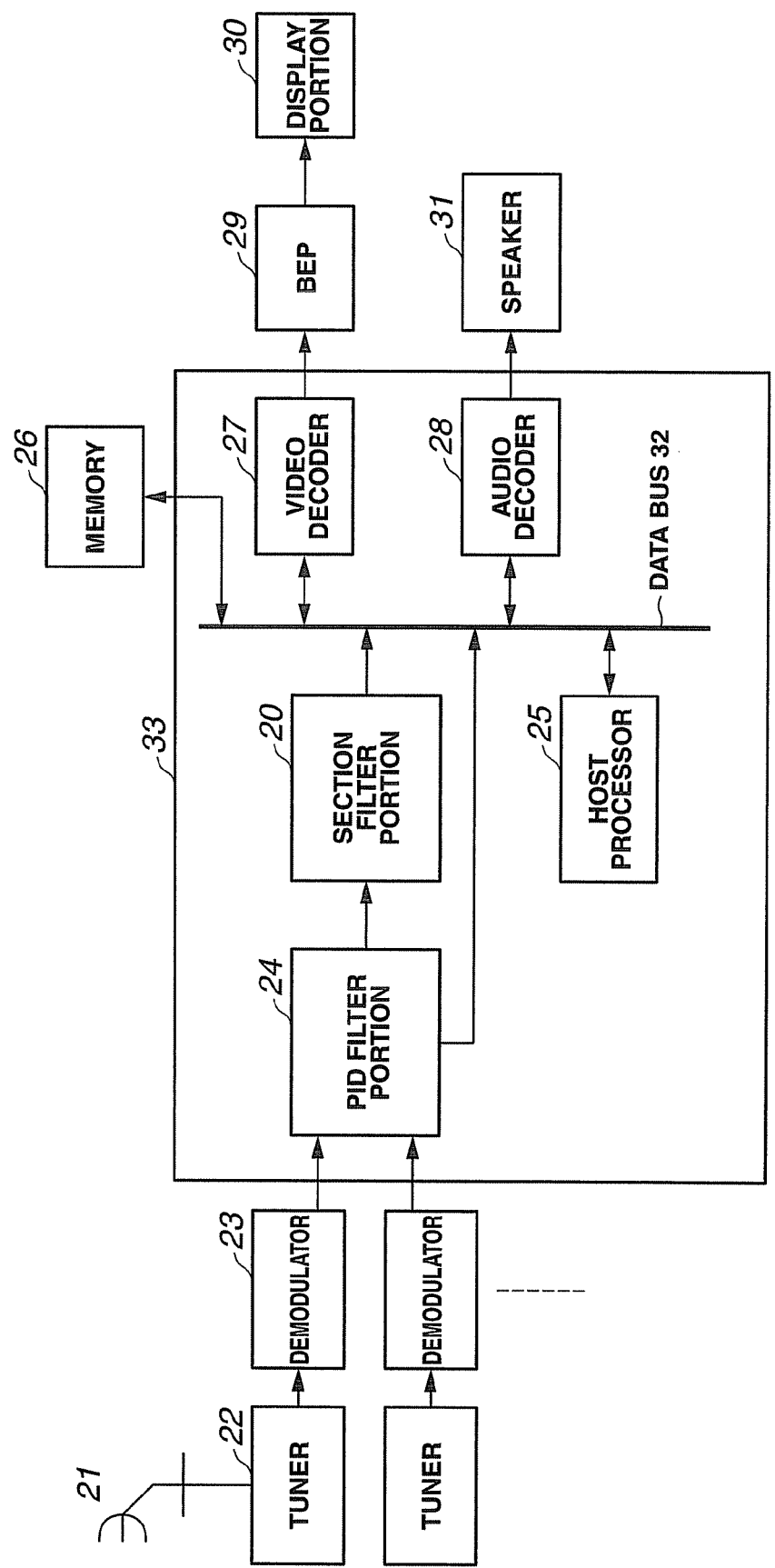

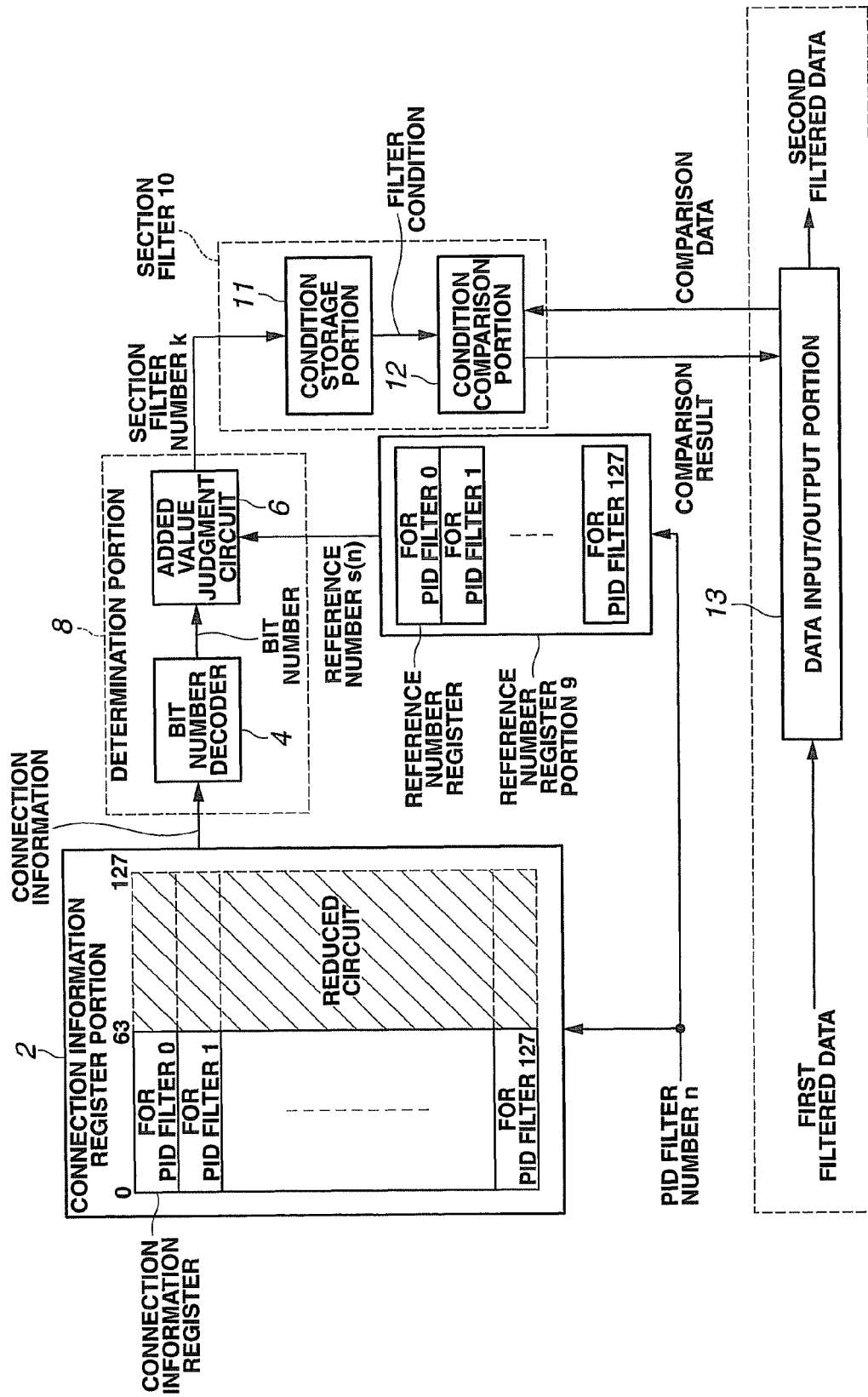

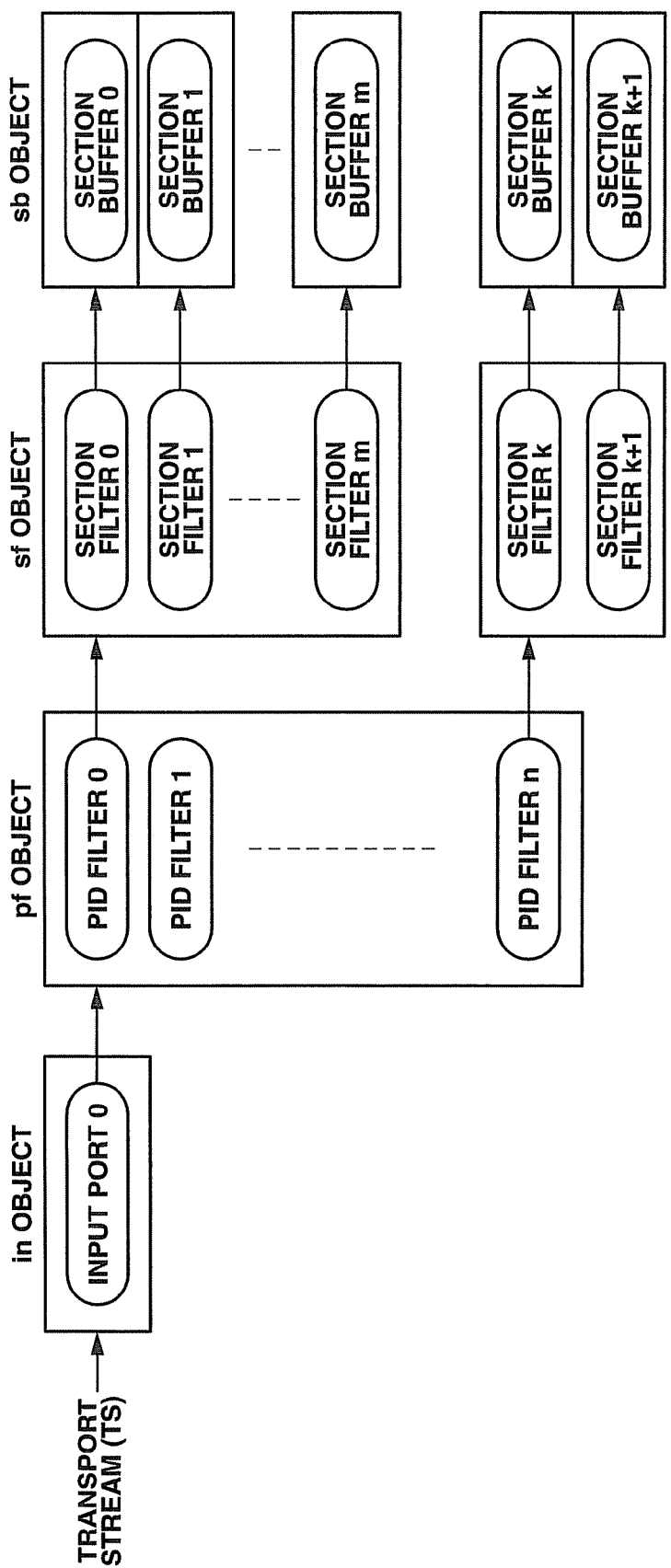

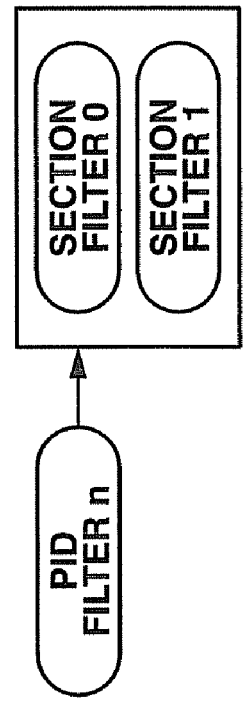
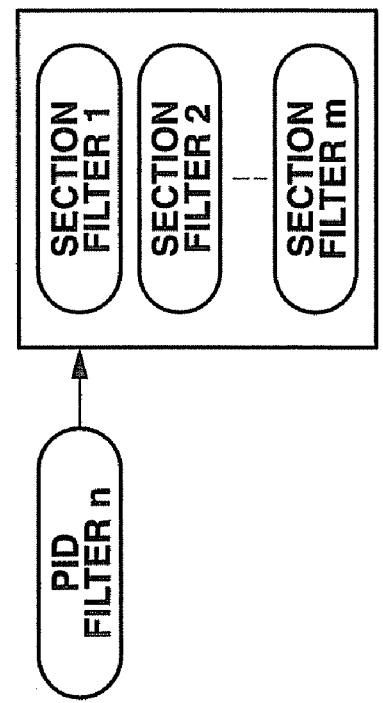

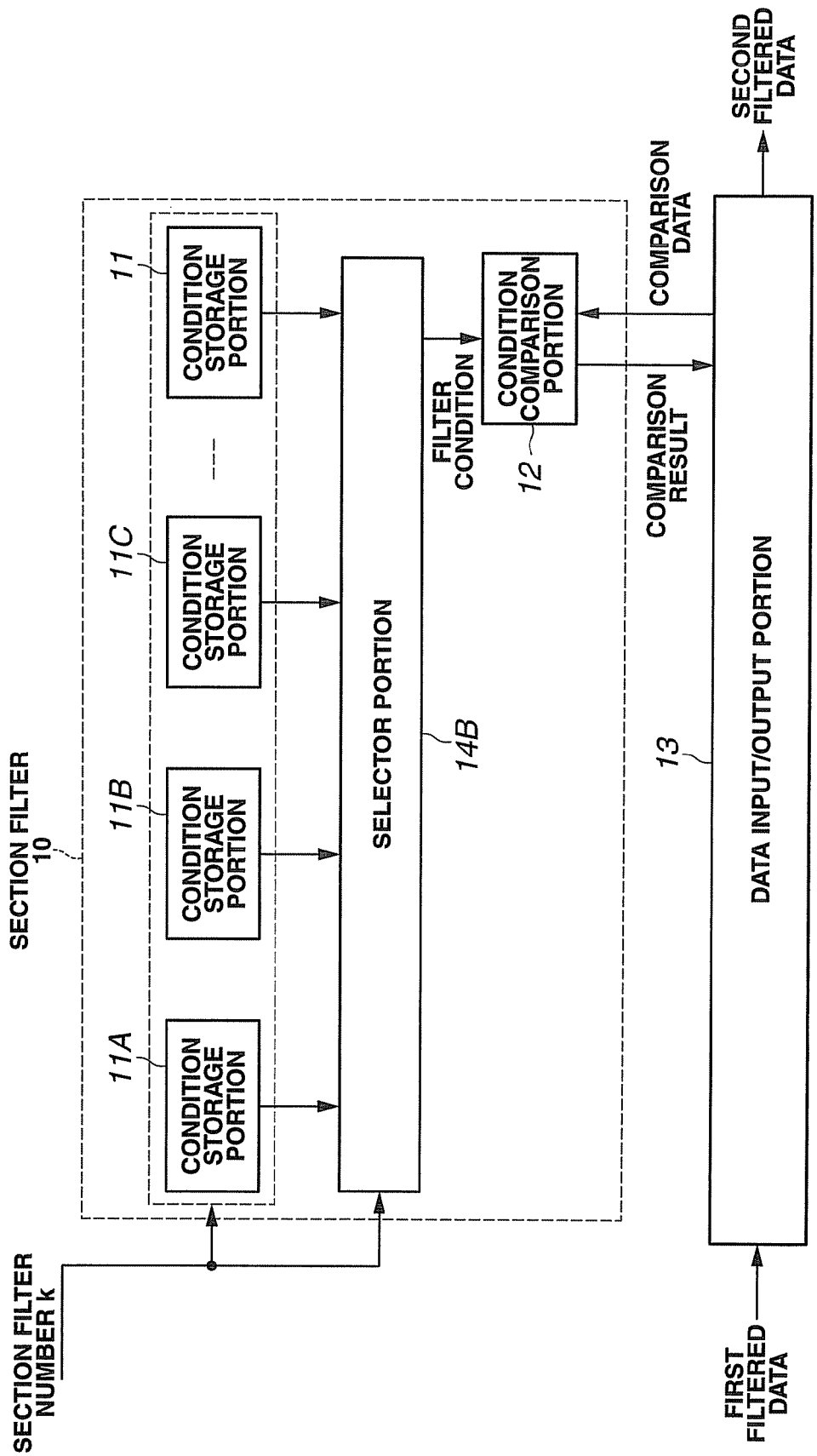

FIG.9A

| SECTION FILTER NUMBER | s(n) | s(n)+1 | | s(n)+30 | s(n)+31 | s(n)+32 | | s(n)+62 | s(n)+63 |
|---|---|---|---|---|---|---|---|---|---|
| BIT NUMBER | 0 | 1 | | 30 | 31 | 32 | | 62 | 63 |
| CONNECTION INFORMATION REGISTER | 0 | 0 | ..... | 0 | 0 | 0 | ..... | 0 | 0 |

FIG.9B

| SECTION FILTER NUMBER | 0 | 1 | | 30 | 31 | 32 | | 62 | 63 |
|---|---|---|---|---|---|---|---|---|---|
| BIT NUMBER | 0 | 1 | | 30 | 31 | 32 | | 62 | 63 |
| CONNECTION INFORMATION REGISTER | 0 | 0 | ..... | 0 | 0 | 0 | ..... | 0 | 0 |

FIG.9C

| SECTION FILTER NUMBER | 96 | 97 | | 127 | 0 | 1 | | 31 | 32 |
|---|---|---|---|---|---|---|---|---|---|
| BIT NUMBER | 0 | 1 | | 30 | 31 | 32 | | 62 | 63 |
| CONNECTION INFORMATION REGISTER | 0 | 0 | ..... | 0 | 0 | 0 | ..... | 0 | 0 |

FIG.10A

| SECTION FILTER NUMBER | s(n) | s(n)+1 | | s(n)+30 | s(n)+31 | s(n)+32 | | s(n)+62 | s(n)+63 |
|---|---|---|---|---|---|---|---|---|---|
| BIT NUMBER | 0 | 1 | | 30 | 31 | 32 | | 62 | 63 |
| CONNECTION INFORMATION REGISTER | 0 | 0 | ..... | 0 | 0 | 0 | ..... | 0 | 0 |

FIG.10B

| SECTION FILTER NUMBER | s(n)+63 | s(n)+62 | | s(n)+32 | s(n)+31 | s(n)+30 | | s(n)+1 | s(n) |
|---|---|---|---|---|---|---|---|---|---|
| BIT NUMBER | 0 | 1 | | 30 | 31 | 32 | | 62 | 63 |
| CONNECTION INFORMATION REGISTER | 0 | 0 | ..... | 0 | 0 | 0 | ..... | 0 | 0 |

FIG.10C

| SECTION FILTER NUMBER | s(n) | s(n)-1 | | s(n)-30 | s(n)-31 | s(n)-32 | | s(n)-62 | s(n)-63 |
|---|---|---|---|---|---|---|---|---|---|
| BIT NUMBER | 0 | 1 | | 30 | 31 | 32 | | 62 | 63 |
| CONNECTION INFORMATION REGISTER | 0 | 0 | ..... | 0 | 0 | 0 | ..... | 0 | 0 |

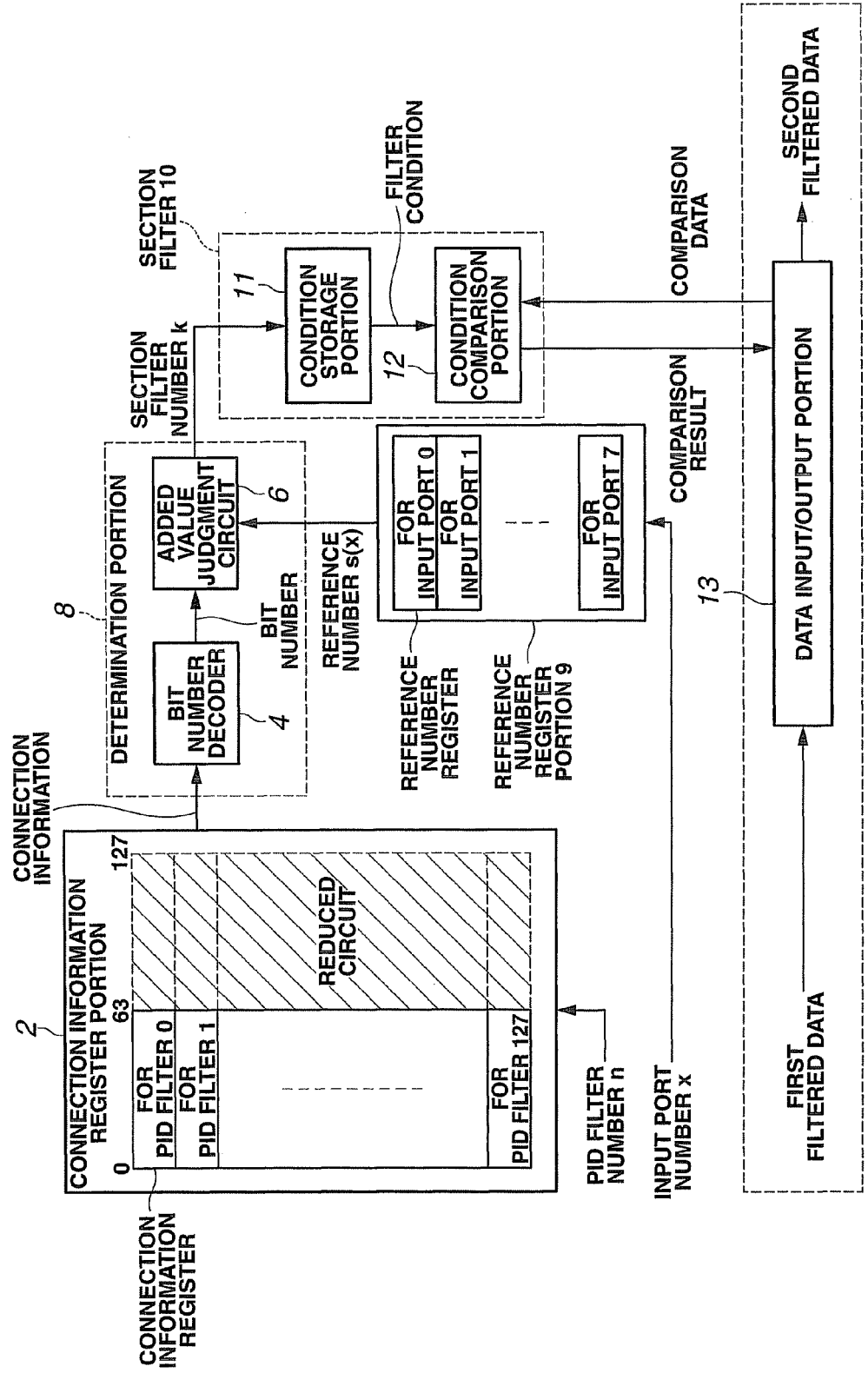

| SECTION FILTER NUMBER | s(x) | s(x)+1 | | s(x)+30 | s(x)+31 | s(x)+32 | | s(x)+62 | s(x)+63 |
|---|---|---|---|---|---|---|---|---|---|
| BIT NUMBER | 0 | 1 | | 30 | 31 | 32 | | 62 | 63 |
| CONNECTION INFORMATION REGISTER | 0 | 0 | ..... | 0 | 0 | 0 | ..... | 0 | 0 |

| SECTION FILTER NUMBER | 0 | 1 | | 30 | 31 | 32 | | 62 | 63 |
|---|---|---|---|---|---|---|---|---|---|
| BIT NUMBER | 0 | 1 | | 30 | 31 | 32 | | 62 | 63 |
| CONNECTION INFORMATION REGISTER | 0 | 0 | ..... | 0 | 0 | 0 | ..... | 0 | 0 |

| SECTION FILTER NUMBER | 96 | 97 | | 127 | 0 | 1 | | 31 | 32 |
|---|---|---|---|---|---|---|---|---|---|
| BIT NUMBER | 0 | 1 | | 30 | 31 | 32 | | 62 | 63 |
| CONNECTION INFORMATION REGISTER | 0 | 0 | ..... | 0 | 0 | 0 | ..... | 0 | 0 |

| SECTION FILTER NUMBER | n-31 | n-30 | | n-1 | n | n+1 | | n+31 | n+32 |
|---|---|---|---|---|---|---|---|---|---|
| BIT NUMBER | 0 | 1 | | 30 | 31 | 32 | | 62 | 63 |
| CONNECTION INFORMATION REGISTER | 0 | 0 | ..... | 0 | 0 | 0 | ..... | 0 | 0 |

| SECTION FILTER NUMBER | 97 | 98 | | 127 | 0 | 1 | | 31 | 32 |
|---|---|---|---|---|---|---|---|---|---|
| BIT NUMBER | 0 | 1 | | 30 | 31 | 32 | | 62 | 63 |
| CONNECTION INFORMATION REGISTER | 0 | 0 | ..... | 0 | 0 | 0 | ..... | 0 | 0 |

| SECTION FILTER NUMBER | 65 | 66 | | 95 | 96 | 97 | | 127 | 0 |
|---|---|---|---|---|---|---|---|---|---|
| BIT NUMBER | 0 | 1 | | 30 | 31 | 32 | | 62 | 63 |
| CONNECTION INFORMATION REGISTER | 0 | 0 | ..... | 0 | 0 | 0 | ..... | 0 | 0 |

FIG.22A

| | | | | | | | | | |
|---|---|---|---|---|---|---|---|---|---|
| SECTION FILTER NUMBER | 0 | 1 | | 30 | 31 | 32 | | 62 | 63 |
| BIT NUMBER | 0 | 1 | | 30 | 31 | 32 | | 62 | 63 |
| USE CONFIRMATION REGISTER | 0 | 0 | ..... | 0 | 0 | 0 | ..... | 0 | 0 |

FIG.22B

| | | | | | | | | | |
|---|---|---|---|---|---|---|---|---|---|
| SECTION FILTER NUMBER | 63 | 62 | | 32 | 31 | 30 | | 1 | 0 |
| BIT NUMBER | 0 | 1 | | 30 | 31 | 32 | | 62 | 63 |
| USE CONFIRMATION REGISTER | 0 | 0 | ..... | 0 | 0 | 0 | ..... | 0 | 0 |

FIG.22C

| | | | | | | | | | |
|---|---|---|---|---|---|---|---|---|---|
| SECTION FILTER NUMBER | 0 | 1 | | 30 | 31 | 32 | | 62 | 63 |
| BIT NUMBER | 0 | 1 | | 30 | 31 | 32 | | 62 | 63 |
| USE CONFIRMATION REGISTER | 1 | 0 | ..... | 0 | 1 | 0 | ..... | 0 | 0 |

FIG.23A

| | | | | | | | | | | | | |
|---|---|---|---|---|---|---|---|---|---|---|---|---|
| SECTION FILTER NUMBER | 0 | 1 | | 30 | 31 | 32 | | 62 | 63 | | 126 | 127 |
| BIT NUMBER | 0 | 1 | | 30 | 31 | 32 | | 62 | 63 | | 126 | 127 |
| USE CONFIRMATION REGISTER | 1 | 1 | ..... | 0 | 0 | 1 | ..... | 0 | 0 | ..... | 0 | 1 |

SHIFT SO THAT THESE BITS MATCH

| | | | | | | | | | |
|---|---|---|---|---|---|---|---|---|---|
| SECTION FILTER NUMBER | 97 | 98 | | 127 | 0 | 1 | | 31 | 32 |
| BIT NUMBER | 0 | 1 | | 30 | 31 | 32 | | 62 | 63 |
| CONNECTION INFORMATION REGISTER | 1 | 0 | ..... | 0 | 1 | 0 | ..... | 0 | 0 |

FIG.23B

| | | | | | | | | | | | | |
|---|---|---|---|---|---|---|---|---|---|---|---|---|
| SECTION FILTER NUMBER | 0 | 1 | | 30 | 31 | 32 | | 96 | 97 | | 126 | 127 |
| BIT NUMBER | 0 | 1 | | 30 | 31 | 32 | | 96 | 97 | | 126 | 127 |
| USE CONFIRMATION REGISTER | 1 | 1 | ..... | 0 | 0 | 1 | ..... | 0 | 1 | ..... | 0 | 1 |

| | | | | | | | | |
|---|---|---|---|---|---|---|---|---|
| SECTION FILTER NUMBER | 0 | 1 | | 31 | 32 | | 97 | 98 | | 127 |
| BIT NUMBER | 31 | 32 | | 62 | 63 | | 0 | 1 | | 30 |
| CONNECTION INFORMATION REGISTER | 1 | 0 | ..... | 0 | 0 | | 1 | 0 | ..... | 0 |

FIG.26A

| ABSOLUTE SECTION FILTER NUMBER | 0 | 1 | | 62 | 63 | 64 | 65 | | 126 | 127 |
|---|---|---|---|---|---|---|---|---|---|---|
| BIT NUMBER | 0 | 1 | | 62 | 63 | 64 | 65 | | 126 | 127 |
| USE CONFIRMATION REGISTER | 0 | 0 | ...... | 0 | 0 | 0 | 0 | ...... | 0 | 0 |

⟵ reg_u ⟶

FIG.26B

| ABSOLUTE SECTION FILTER NUMBER | 0 | 1 | | 62 | 63 | 64 | 65 | | 126 | 127 |
|---|---|---|---|---|---|---|---|---|---|---|
| RELATIVE SECTION FILTER NUMBER | 0 | 1 | | 62 | 63 | 0 | 1 | | 62 | 63 |
| ABSOLUTE BIT NUMBER | 0 | 1 | | 62 | 63 | 64 | 65 | | 126 | 127 |
| RELATIVE BIT NUMBER | 0 | 1 | | 62 | 63 | 0 | 1 | | 62 | 63 |
| USE CONFIRMATION REGISTER | 0 | 0 | ..... | 0 | 0 | 0 | 0 | ..... | 0 | 0 |

⟵ reg_u(0) ⟶ ⟵ reg_u(1) ⟶

FIG.26C

| ABSOLUTE SECTION FILTER NUMBER | 0 | | 31 | 32 | | 63 | 64 | | 95 | 96 | | 127 |
|---|---|---|---|---|---|---|---|---|---|---|---|---|
| RELATIVE SECTION FILTER NUMBER | 0 | ... | 31 | 0 | ... | 31 | 0 | ... | 31 | 0 | ... | 31 |
| ABSOLUTE BIT NUMBER | 0 | | 31 | 32 | | 63 | 64 | | 95 | 96 | | 127 |
| RELATIVE BIT NUMBER | 0 | ... | 31 | 0 | ... | 31 | 0 | ... | 31 | 0 | ... | 31 |
| USE CONFIRMATION REGISTER | 0 | ... | 0 | 0 | ... | 0 | 0 | ... | 0 | 0 | ... | 0 |

⟵ reg_u(0) ⟶ ⟵ reg_u(1) ⟶ ⟵ reg_u(2) ⟶ ⟵ reg_u(3) ⟶

FILTERING APPARATUS AND DIGITAL BROADCAST RECEIVING APPARATUS

CROSS-REFERENCE TO RELATED APPLICATION

This application is based upon and claims the benefit of priority from the prior Japanese Patent Application No. 2006-338740, filed on Dec. 15, 2006; the entire contents of which are incorporated herein by this reference.

BACKGROUND OF THE INVENTION

1. Field of the Invention

The present invention relates to a filtering apparatus and a digital broadcast receiving apparatus suitable for use in, for example, a digital television, a digital recorder and the like.

2. Description of the Related Art

Over recent years, digital broadcasting adopting MPEG-2 standard encoding has started. One Transport Stream (TS), as defined by the MPEG-2 standard, is capable of carrying one or more programs. A TS is constituted by packets having fixed lengths of 188 bytes (TS packets), which include (or are multiplexed with) video data, audio data and other data.

Information related to the same type of data is multiplexed in a single TS packet, and an identification signal (PID) indicating the type of the data is affixed thereto. This enables simultaneous transfer of predetermined private data or the like in addition to video and audio data, which can be utilized in the fields of broadcasting, communication or storage.

A digital broadcast receiving apparatus is provided with a function for referencing PIDs from sequentially inputted TS packets and filtering TS packets having the same PID. As a result, it is now possible to reproduce or record only desired programming (also referred to as a program, content, a channel or the like) from a stream.

The processing of filtering using PIDs is referred to as PID filtering and involves comparisons with a filtering condition (or a filter condition; when related to PID filtering, also referred to as a PID filter condition or the like) respectively corresponding to each PID. A portion at which comparisons are performed is referred to as a PID filter (in some cases, a PID filter refers to a part up to and including the portion retaining a filter condition). Supplying a PID filter with data multiplexed on a TS packet and which at least includes a PID enables filtering of TS packets having PIDs that satisfy a PID filter condition preset on each PID filter.

Other data include data related to information referred to as Service Information (SI) that is carried by a structure referred to as a section. Data in one section structure (hereinafter referred to as section data) includes various information such as a table number, a section length, previous updates (version number), if any, or the like. Transmission may be performed in various formats, such as multiplexing one or more section data on one TS packet, or splitting one section data into two or more TS packets. A case where a plurality of section data is multiplexed in one TS packet is referred to as multi-section transmission format or the like, while a case where only all or a part of one section data is multiplexed is referred to as single-section transmission format or the like. In other words, when section data multiplexed in TS packets filtered by a PID filter is in multi-section transmission format, further filtering is necessary by identifying desired section data using a table number or the like from the plurality of section data multiplexed on the TS packets filtered by the PID filter. Obviously, even in single-section transmission format, if, for example, section data having the same table number but also having a newest version number is desired, further filtering is necessary.

The processing of filtering using information (such as a table number) included in section data is referred to as section filtering, which involves comparisons with a filtering condition (or a filter condition; when related to section filtering, also referred to as a section filter condition or the like) respectively corresponding to each section data. A portion at which comparisons are performed is referred to as a section filter (in some cases, a section filter refers to a part up to and including the portion retaining a filter condition). Supplying data constituted by all or a part of TS packets filtered by PID filtering and which includes at least a part of section data to a section filter enables filtering of section data having information (a table number, a section length or the like) that satisfies a section filter condition preset on each section filter.

Accordingly, a digital broadcast receiving apparatus (hereinafter also referred to as a receiving apparatus) must be capable of filtering section data using one or more section filters from TS packets filtered by one PID filter. Therefore, in order to flexibly accommodate transmission formats, it is desirable that one or more section filters mounted on the receiving apparatus can be used arbitrarily for data with respect to data filtered by a PID filter mounted thereon (hereinafter described as "a section filter is connectable to a PID filter" or the like).

Generally, a plurality of mounted filters (or filter conditions used by the filters) is identified by numbers (e.g., integers equal to or more than 0). During section filtering, management by numbers (hereinafter "filter number management") is performed, such as exemplified by arranging section data to be filtered using section filters number 3 to 6 from TS packets filtered using the 1st PID filter.

Such management requires connection information between a PID filter number and a section filter number. A portion (a storage element, a memory, a register or the like) retaining connection information is referred to as a connection information register. Management is possible when at least 1 bit of information is retainable per one PID filter. For example, management can be performed by arranging a bit value of "0" (a low level when a digital signal is assumed) to indicate an "unconnected (unused)" state and a bit value of "1" (a high level when a digital signal is assumed) to indicate a "connected (in use)" state.

Accordingly, in order to maximize flexibility in accommodating various broadcast formats, it is desirable that all PID filters mounted on a receiving apparatus are connectable to all section filters mounted thereon. In other words, if n denotes the number of mounted PID filters and k denotes the number of mounted section filters, a connection information register capable of retaining at least n×k bits of information (hereinafter referred to as an "n×k-bit connection information register" or the like) is required.

Conventionally, the number of section filters connectable to each PID filter is not limited, i.e., all section filters in the receiving apparatus are connectable to each PID filter. In other words, an arbitrary PID filter is freely connectable to, for example, a section filter not used by (not connected to) another PID filter. This enables filter processing to flexibly accommodate broadcast formats.

Therefore, there is a problem in that hardware scale (circuit size) of a connection information register increases dramatically according to the number of filters. For example, a connection information register of 16,384 bits is required in a case where n and k are both 128, while a connection information register of 65,536 bits is required in a case where n and k are both 256.

Furthermore, an increase in the number of programs in recent years has led to an upward trend in the required number of PID filters and section filters in a receiving apparatus, which has only aggravated the problem.

In consideration of these problems, a technique for reducing the number of bits required by a connection information register is proposed in Japanese Patent Laid-Open No. 2005-333474 (hereinafter referred to as Document 1). According to Document 1, by setting a restrictive range of, for example, n−31<k≦n+32 on k-number of section filters connectable to n-number of PID filters, a connection information register is limited to 64 bits per one PID filter regardless of the number of mounted section filters.

Therefore, for example, in the case where n and k are both 128, filter number management can now be performed by a connection information register of 8,182 bits, and in the case where n and k are both 256, by a connection information register of 16,384 bits. Consequently, even in comparison with the example described above, reliable filtering processing is now possible without dramatically increasing hardware scale.

According to Document 1, an identification number (absolute number) which uniquely determines a PID filter or a section filter can be used to identify a section filter to be connected to a PID filter. Therefore, for example, if it is assumed that there are 128 mounted PID filters and 128 mounted section filters respectively managed by absolute numbers 0 to 127, in the event that section filters number −31 to −1 and 128 to 159 which actually do not exist under the restrictive range described above become connectable, filter number management must now assume that a minimum value 0 and a maximum value 127 of the absolute numbers are consecutive and determine that −31 to −1 are connectable to 97 to 127 and 128 to 159 are connectable to 0 to 31. The processing of determining a new connectable absolute number from a number that does not exist as a connectable number by adding/subtracting (or multiplying/dividing) a given offset value depending on whether the number falls below the minimum value of a restrictive range or exceeds the maximum value thereof, as described above, shall be referred to as "fold-back processing" in the following description. This processing is necessary to realize the effective use of section filters by enabling connectable section filter numbers to be cyclically specified.

However, the need for cyclic specification gives rise to a problem in that fold-back processing is now required in filter number management during section filtering, thereby complicating the processing of filtering performed by a receiving apparatus.

SUMMARY OF THE INVENTION

A filtering apparatus according to an aspect of the present invention includes: at least one or more first filters each assigned a predetermined number and used to filter packets having a predetermined identifier from inputted packets; at least one or more connection information registers disposed in correspondence with the first filters and which are configured to retain information having a predetermined number of bits; at least one or more second filters each assigned a predetermined number and used to filter all or a part of the packets filtered using the first filters; a condition storage portion configured to store at least one or more types of filter conditions for identifying all or a part of the packets associated to the second filters; at least one or more reference number registers configured to allocate any one of the numbers of the second filters as a reference number to each number of the first filter and to store the reference number; and a determination portion configured to determine, based on the reference number and on a value of the connection information register corresponding to the first filter, the number of the second filter to be used to further filter all or a part of all or a part of the packets filtered using the first filter.

A filtering apparatus according to another aspect of the present invention includes: at least one or more first filters used to filter packets having a predetermined identifier from packets inputted from at least one or more input ports each assigned a predetermined number; at least one or more connection information registers disposed in correspondence with the first filters and which are configured to retain information having a predetermined number of bits; at least one or more second filters each assigned a predetermined number and used to filter all or a part of the packets filtered using the first filters; a condition storage portion configured to store at least one or more types of filter conditions for identifying all or a part of the packets associated to the second filters; at least one or more reference number registers configured to allocate any one of the numbers of the second filters as a reference number to each number of the input ports and to store the reference number; and a determination portion configured to determine, based on the reference number and on a value of the connection information register corresponding to the first filter, the number of the second filter to be used to further filter all or a part of all or a part of the packets filtered using the first filter.

A filtering apparatus according to yet another aspect of the present invention includes: at least one or more input ports each assigned a predetermined number; at least one or more first filters each assigned a predetermined number and used to filter packets having a predetermined identifier from packets inputted from the input port; at least one or more connection information registers disposed in correspondence with the first filters and which are configured to retain information having a predetermined number of bits; at least one or more second filters each assigned a predetermined number and used to filter all or a part of the packets filtered using the first filters; a condition storage portion configured to store at least one or more types of filter conditions for identifying all or a part of the packets associated to the second filters; at least one or more reference number registers configured to allocate any one of the numbers of the second filters as a reference number to each number of the first filter and each number of the input port and to store the reference number; and a determination portion configured to determine, based on the reference number and on a value of the connection information register corresponding to the first filter, the number of the second filter to be used to further filter all or a part of all or a part of the packets filtered using the first filter.

In addition, a digital broadcast receiving apparatus according to an aspect of the present invention includes: a demodulation portion configured to perform demodulation processing on received stream data and to output the same as a packet; the filtering apparatus according to the aspect of the present invention which is configured to accept the packet as an input; an output portion configured to output all or a part of the packets filtered by the filtering apparatus using the first filter or all or a part of the packets filtered by the filtering apparatus using the second filter; and a processor configured to perform various processing using all or a part of the packets outputted from the output portion.

A digital broadcast receiving apparatus according to another aspect of the present invention includes: a demodulation portion configured to perform demodulation processing on received stream data and to output the same as a packet; the filtering apparatus according to the other aspect of the present invention which is configured to accept the packet as an input; an output portion configured to output all or a part of the packets filtered by the filtering apparatus using the first filter or all or a part of the packets filtered by the filtering apparatus using the second filter; and a processor configured to perform various processing using all or a part of the packets outputted from the output portion.

BRIEF DESCRIPTION OF THE DRAWINGS

FIG. 1 is a block diagram showing a first digital broadcast receiving apparatus incorporating a filtering apparatus according to the present invention;

FIG. 2 is a block diagram showing a specific configuration of a section filter portion 20 shown in FIG. 1 according to a first embodiment;

FIG. 3 is a diagram schematically showing a process flow of general PID filtering and section filtering according to the present invention;

FIGS. 4A to 4C are diagrams illustrating examples of use of a connection information register to be used in the present invention;

FIG. 8 is a block diagram showing a configuration example in a case where two or more section filters are mounted;

FIGS. 9A to 9C are diagrams showing a relationship between bit numbers and section filter numbers of a connection information register according to the first embodiment;

FIGS. 10A to 10C are diagrams showing a relationship between bit numbers and section filter numbers of a connection information register according to the first embodiment;

FIG. 12 is a block diagram showing a specific configuration of the section filter portion 20 shown in FIG. 1 according to a second embodiment;

FIGS. 22A to 22C are diagrams illustrating a use confirmation register;

FIGS. 23A and 23B are diagrams schematically showing processing for retrieving an unused section filter according to Document 1;

FIGS. 26A to 26C are diagrams showing examples of use of a use confirmation register according to the present invention;

DETAILED DESCRIPTION OF THE PREFERRED EMBODIMENTS

Figure 5A:
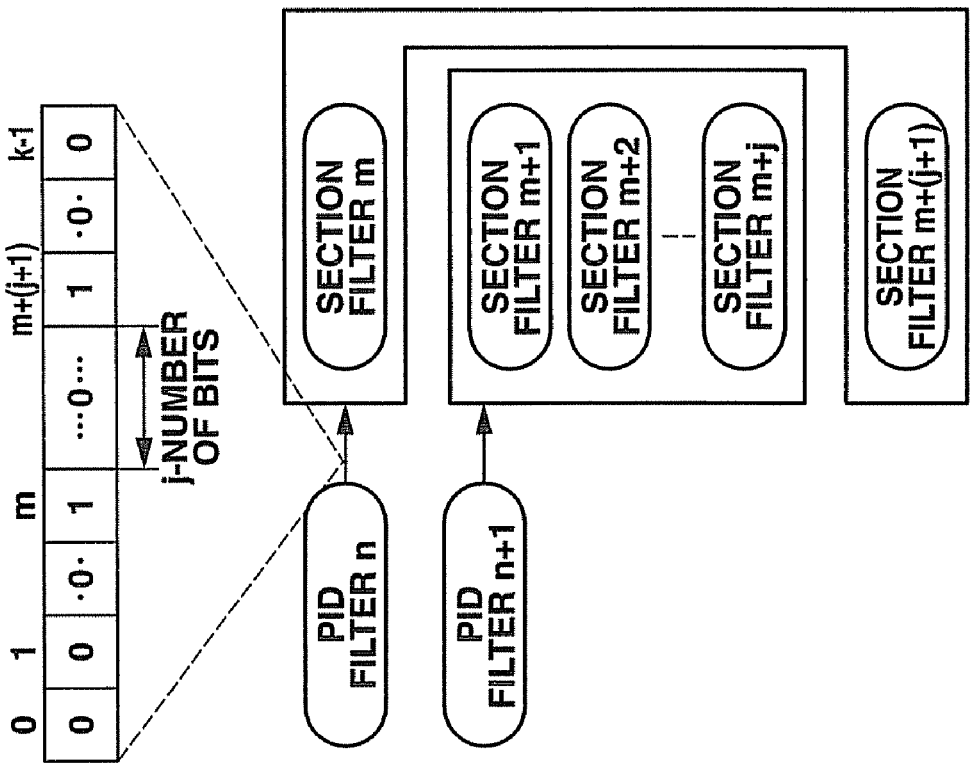
FIGS. 5A and 5B are diagrams illustrating operations related to additional connections of section filters of a connection information register.

Embodiments of the present invention will now be described in detail with reference to the drawings.
(Method for Using a Connection Information Register)

FIG. 3 is a diagram schematically showing a process flow of general PID filtering and section filtering at a receiving apparatus.

First, a description will be given on a method of use of a connection information register (or connection information retained therein) in the processing of filtering section data at a receiving apparatus with reference to FIG. 3.

In FIG. 3, entities enclosed in circles are processing mechanisms to/from which data is input/output. Shown here are: an input port assigned number 0; PID filters assigned numbers 0 to n; section filters assigned numbers 0 to m, k, and k+1; and section buffers assigned numbers 0 to m, k, and k+1. An input port represents a mechanism configured to receive a TS; a PID filter represents a mechanism configured to filter TS packets in which desired data is multiplexed from TS packets (to perform PID filtering); a section filter represents a mechanism configured to further filter section data from TS packets filtered by the PID filter (to perform section filtering) in the event that desired data is section data; and a section buffer represents a mechanism configured to accumulate section data filtered by the section filter.

The PID filters 0 to n each compare a preset PID value with a PID value included in an inputted TS packet, and if both PID values match each other, filter a required data part (all or a part of the TS packet) and output the same to section filters in a subsequent stage.

In FIG. 3, a set of processing mechanisms to which the same data is input is enclosed by a rectangle. For convenience, this rectangle shall be referred to as an object. As shown in FIG. 3, four types of objects exist depending on the type of processing mechanisms enclosed, namely, an input port object (in object), a PID filter object (pf object), a section filter object (sf object) and a section buffer object (sb object).

An in object receives TS, and, for each TS packet, outputs the same to a pf object in a subsequent stage. The manner in which outputted data is transferred is depicted by arrows. Connection information is required when transferring data from one processing mechanism to another.

At a pf object, the same TS packet is inputted to PID filters 0 to n. When a TS packet having a preset PID is inputted, each of the 0th to nth PID filters first filter the TS packet. In the case where the connection information of the PID filter that performed filtering indicates a section filter, a required data part from the TS packet (all or a part of the TS packet) is outputted to an sf object in a subsequent stage.

FIG. 3 shows that section filters 0 to m are specified by connection information as a processing mechanism to which data is to be transferred (connection destination) from PID filter 0, while section filters k and k+1 are specified as a connection destination to which data is to be transferred from PID filter n.

At an sf object, for example, data filtered by and outputted from the PID filter 0 is inputted to each of the section filters 0 to m. Each of the 0th to mth section filters filter section data having specific preset information (a table number, a version number or the like). In the case where the connection information of the section filter that performed filtering indicates a section buffer, the section data is outputted to an sb object in a subsequent stage.

At an sb object, section buffers 0 to m, k, and k+1 are disposed so as to respectively correspond to section filters 0 to m, k, and k+1. The section buffers 0 to m, k, and k+1 accept and accumulate section data outputted from corresponding section filters 0 to m, k, and k+1.

As seen, with respect to a TS inputted to an input port, a TS packet is filtered through PID filtering, and desired section data is further filtered through section filtering and accumulated (otherwise, also expressible as "stored", "extracted" or the like) at a section buffer.

During this routine, in order to specify a processing mechanism that becomes a connection destination of data filtered by each processing mechanism, at least connection information becomes necessary with respect to the connection source.

Among such connection-information, the present invention focuses attention on connection information that becomes necessary for the connection between PID filters and section filters which causes the total circuit size of a storage element (a memory, a register or the like) retaining these filters to become larger than other storage elements, and first proposes size reduction of circuits required for retaining connection information.

Accordingly, in the following description, unless otherwise noted, the expressions "connection information" and "connection information register" shall respectively indicate connection information to be required during connection of PID filters and section filters and a storage element that retains the connection information. Although the connection information register is expressed hereinafter in various ways such as "a connection information register for a PID filter", "a connection information register allocated to a PID filter", and "a connection information register associated with a PID filter", it should be understood that, unless otherwise noted, all such expressions signify the same entity.

FIGS. 4A to 4C are diagrams illustrating examples of use of a connection information register.

As described above, a connection information register 100 shown in FIG. 4A is allocated to each of the PID filters 0 to n.

The connection information register 100 is configured so as to be capable of retaining at least information including the same number of bits as the number of section filters connectable to a PID filter.

For example, as shown in FIG. 4A, if connection is possible to a total of k-numbers of section filters whose numbers range from 0 to k−1, the connection information register 100 is configured to be capable of retaining at least k-bits of information.

A connection relationship between a PID filter and a section filter is determined by a value and a position of a bit set in the connection information register 100. In other words, an initial value of the connection information register is first set to "0", and according to a position of a bit having a set value of "1", the number of a section filter connected to a PID filter to which is allocated the connection information register is determined. Specifically, setting a bit having a number corresponding to the number of the section filter in the connection information register 100 to "1" indicates that section filter having the number is connected.

For example, in the example shown in FIG. 4B, the 1st to mth bits in the connection information register 100 are set to "1", thereby indicating that the section filters 1 to m are to be connected to the PID filter n.

In the example shown in FIG. 4C, the 0th and 1st bits in the connection information register 100 are set to "1", thereby indicating that two section filters 0, 1 are to be connected to the PID filter n.

This means that, in FIG. 3, the bits corresponding to section filters 0 to m in the connection information register of the PID filter 0 is set to "1" and the bits corresponding to section filters k and k+1 in the connection information register of the PID filter n is set to "1".

Consequently, in the case where the following two functions (a) and (b) are supported by a receiving apparatus (or a filtering apparatus incorporated therein) in order to flexibly accommodate various broadcast modes, all mounted section filters must be connectable to all mounted PID filters, thereby dramatically increasing the circuit size of the connection information register in accordance with the number of filters.

(a) Allowing an arbitrary number of section filters to be connectable to an arbitrary PID filter (b) Allowing an arbitrary section filter to be connectable to an arbitrary PID filter However, a close review of the above-described (a) and (b) as provided below reveals that all mounted section filters need not necessarily be connectable to all PID filters mounted on a receiving apparatus.

First, item (a) will be considered.

Undoubtedly, when, for instance, a plurality of types of section data (e.g. each having a different table number) having the same PID is transmitted by one TS packet from a transmitting side (in the case of multi-section transmission), the greater the number of section filters connectable to one PID filter, the more flexibly various broadcast modes can be accommodated.

However, the ARIB standard to which Japanese domestic digital broadcasting must comply stipulates that, at present, the maximum number of types of sections transferable by TS packets of the same PID is 10. Meanwhile, the DVB standard to which European digital broadcasting must comply stipulates that the maximum number of types of such sections is 6.

From these facts, it is conceivable that even if an arbitrary number of section filters are not connectable to one PID filter, no problems will arise in actual practice as long as sufficient allowance is provided by arranging, for example, about 16 section filters to be connectable. In other words, it is conceivable that no problems will arise even if the number of section filters connectable to the PID filter is reduced in comparison to a conventional case.

Next, item (b) will be considered.

Undoubtedly, various broadcast modes can be flexibly accommodated if a PID filter is connectable to an arbitrary section filter, such as exemplified by a case where connections of section filters to a PID filter increases and decreases chronologically.

As an example, a case will be considered where the number of section data to be filtered from packets of the same PID increases as a result of switching from one broadcasted program to another.

Figure 5B:
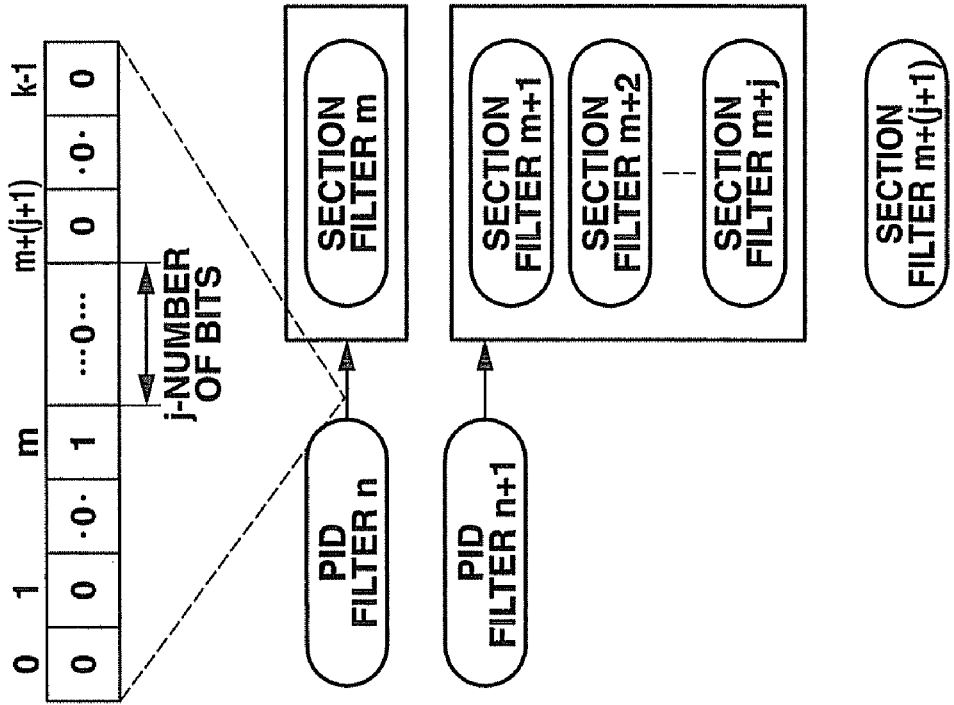

FIGS. 5A and 5B are diagrams showing examples in which a section filter to be connected to a PID filter is added. More specifically, FIG. 5A shows a state prior to addition, while FIG. 5B shows a state after addition.

As shown in FIG. 5A, in the case where the PID filter n is using the mth section filter and the PID filter n+1 is using m+1th to m+jth section filters prior to switching programs at which time the addition of one section filter to the PID filter n is required, usually, filter number management is performed so that the PID filter n uses a nearby section filter such as, for example, the m−1th or the m+1th section filter. When the section filters are already used, an unconnected (unused) section filter nearest to the mth section filter, such as the m+(j+1)th section filter, is used as shown in FIG. 5B, thereby making it possible to accommodate the switching of programs.

Therefore, if it is assumed that a restriction is imposed on the range of section filters connectable to the PID filter n and that all section filters in that range are in use, a section filter connectable to the PID filter n does not exist and new section data cannot be filtered from a TS packet filtered by the PID filter n. From this fact, it is conceivable that a problem may arise in that various broadcast modes cannot be accommodated if the range of section filters connectable to the PID filter is excessively narrowed down.

However, since the maximum number of section filters increased or decreased at one time is often, for example, 2 to 3, and the number of section filters required to connect to one PID filter is usually somewhat fixed as can be understood from the description of (a), it is conceivable that no problems will arise even if the range or the quantity of section filters connectable to the PID filter is somewhat narrowed down.

From the review described above, it is understood that the circuit size of a connection information register can be suppressed without impairing its flexibility for accommodating various broadcast modes by imposing a certain restriction on the number k of the section filter connectable to the PID filter of an arbitrary number n.

It is thus a feature of the present invention that, by determining any one of the number of the section filters as a reference number, allocating one reference number to at least one or more PID filters, and arranging only a quantity (numbers) of section filters that are specified by the allocated reference number to be connectable to the PID filter, section filters can be managed in a simple manner as relative numbers from a reference number while suppressing the circuit size of the connection information register.

Five embodiments will be presented below as adaptation examples of the present invention. Advantageous effects of the present invention will be described at the end of the present document.

However, it should be noted that the adaptation examples shown below are merely illustrative and the present invention is not limited to the following examples. Rather, various modifications can be made within the scope of the claims, or various alterations can be made using combinations of means described in the claims, in which case the present invention encompasses all such modifications and alterations.

First Embodiment

A first embodiment is an example in which one reference number is allocated to one PID filter.

In other words, the restriction expressed by Formula 1 below is imposed between the number n PID filter and the number k of the section filter connectable thereto.

$$s(n) \leq k < s(n)+j \quad \text{(Formula 1),}$$

where j denotes the quantity of connectable section filters which becomes a reference value for determining the capacity (number of bits) of the connection information register. $s(n)$ denotes a reference number allocated to the number n PID filter.

In other words, the number k of a section filter connectable to the PID filter of number n is to be restricted to a range of numbers offset by j from the reference number $s(n)$.

In order to make the present invention easily understandable, a detailed description of Formula 1 will be given below using a specific example.

Assume that, for example, the number of mounted PID filters and the number of mounted section filters are both 128 and are respectively identified by numbers 0 to 127.

Further assume that the value of j is 64 or, more specifically, that the capacity of the connection information register of each PID filter is set to 64 bits (½ of what is conventional). Applying the above conditions to Formula 1 results in the following formula.

$$s(n) \leq k < s(n)+64 \, (0 \leq s(n) < 128) \quad \text{(Formula 2).}$$

Since a whole number between 0 and 127 is allocated to the numbers of the section filters, $s(n)$ also assumes any whole number between 0 and 127. Therefore, if the right-hand side "$s(n)+64$" of Formula 2 exceeds 127 (the maximum value of section filter numbers), arranging section filters whose number is section filter number 0 (the minimum value of section filter numbers) and thereafter to be connectable shall suffice.

For example, when the reference number $s(n)$ allocated to the PID filter n takes a value of 67, it is derivable from Formula 2 that section filters (128, 129 and 130) having numbers greater than 127, the maximum value of section filter numbers, become connectable. However, in this case, the continuity of section filter numbers shown in FIG. 11 should be applied to enable connection from a section filter having a minimum value of section filter numbers (in the present example, 0).

In other words, a total of 64 section filters for which k ranges from 115 to 127 and from 0 to 2 are connectable to the PID filter n for which $s(n)=67$.

According to Formula 2, a maximum of 64 section filters are connectable to one PID filter, which conceivably is a sufficient number as can be understood from the description of (a). In addition, the numbers of section filters connectable to the PID filter can now be managed as relative numbers from $s(n)$. Although the range of section filters connectable to the PID filter will be restricted, it is conceivable that no problems will occur as shown by the above review result.

For example, a case will now be considered where, in Formula 1, seven PID filters 50 to 56 having 64 as their reference number respectively uses 10 section filters (a case where a restriction in which j is set to 10 in Formula 1 is imposed).

In other words, a case will be considered where reference numbers are set as follows.

$$s(50)=s(51)=s(52)=s(53)=s(54)=s(55)=s(56)=64 \quad \text{(Formula 3)}$$

The numbers of section filters connectable to each PID filter can now be managed as offset numbers (relative numbers) from the reference number. In the present example, the relative numbers of the section filters are 0 to 63.

Let us now assume that the PID filters 50 to 56 are to be respectively sequentially connected to 10 section filters in ascending order of their numbers.

More specifically, the PID filter 50 is to be connected to section filters whose relative numbers are 0 to 9;

next, the PID filter 51 is to be connected to section filters whose relative numbers are 10 to 19;

next, the PID filter 52 is to be connected to section filters whose relative numbers are 20 to 29;

next, the PID filter 53 is to be connected to section filters whose relative numbers are 30 to 39;

next, the PID filter 54 is to be connected to section filters whose relative numbers are 40 to 49; and the PID filter 55 is to be connected to section filters whose relative numbers are 50 to 59.

Since the reference number of the respective PID filters is 64, expressing the relative numbers using absolute numbers (the numbers allocated in order to identify each mounted section filter; in the present example, 0 to 127) results in the following description.

The PID filter 50 is to be connected to section filters whose absolute numbers are 64 to 73;

the PID filter 51 is to be connected to section filters whose absolute numbers are 74 to 83;

the PID filter 52 is to be connected to section filters whose absolute numbers are 84 to 93;

the PID filter 53 is to be connected to section filters whose absolute numbers are 94 to 103;

the PID filter 54 is to be connected to section filters whose absolute numbers are 104 to 113; and the PID filter 55 is to be connected to section filters whose absolute numbers are 114 to 123.

At this point, since connectable section filters having relative numbers 0 to 59 (absolute numbers 64 to 123) whose relative numbers 0 to 63 (absolute numbers 64 to 127) are connected by other PID filters 50 to 55, the PID filter 56 is now only connectable to four section filters 60 to 63 (124 to 127).

In a conventional case, since all PID filters are connectable to all mounted section filters, the PID filter 56 would be connectable to other unconnected section filters such as section filters having absolute numbers 0 to 5.

However, as is apparent from the review result of (a) provided above, it is conceivable that such occurrences are quite uncommon in actual practice.

Figure 6A:
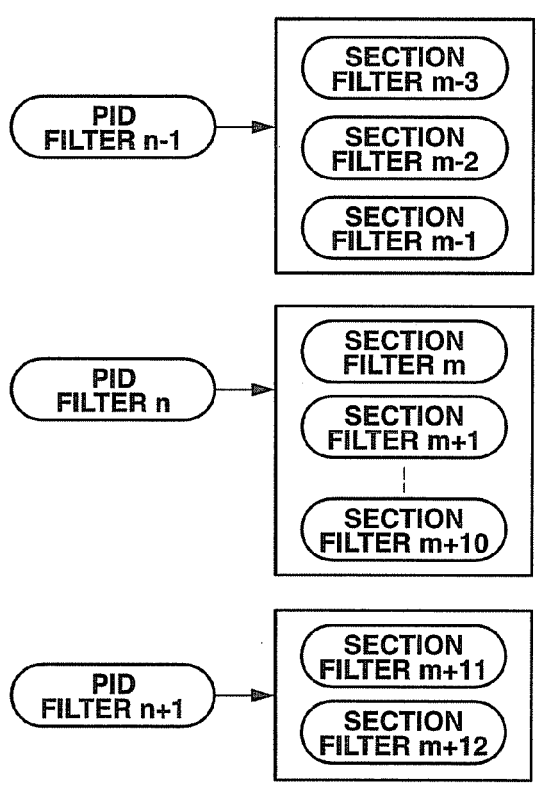
FIGS. 6A and 6B are schematic diagrams illustrating connection examples between PID filters and section filters.
Figure 6B:
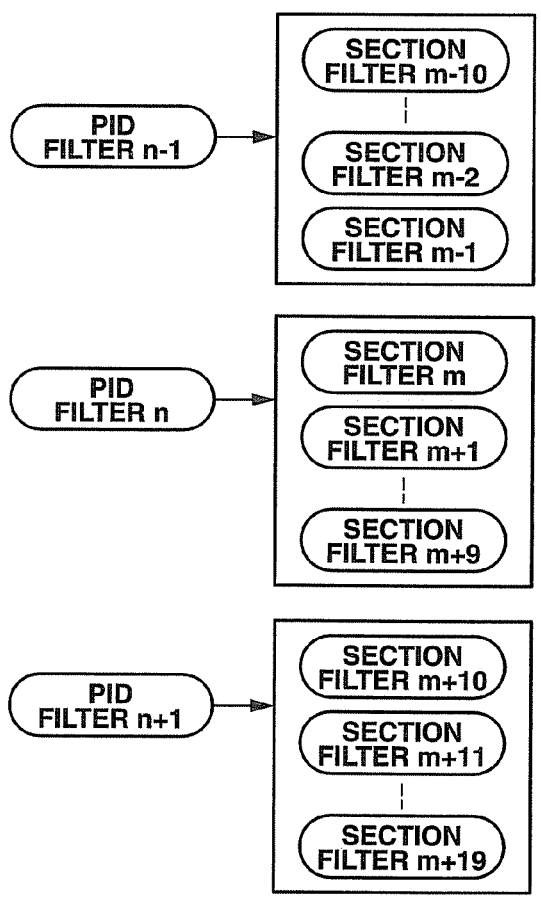

FIGS. 6A and 6B show connection examples of PID filters and section filters.

FIG. 6A presents a general case while FIG. 6B presents an extremely rare case. As shown in FIG. 6A, normally, when a large number (e.g., 10) of section filters m, m+2 to m+10 are connected to the PID filter n, nearby PID filters n−1, n+1 and the like often only need to be connectable to several (e.g., two to three) section filters.

In actual practice, it is extremely rare that each of the PID filters whose numbers are adjacent (or nearby) require connection to a large number (e.g., 10) of section filters, as shown in FIG. 6B.

In consideration thereof, instead of overlapping the ranges of section filters connectable to the respective PID filters as described above, it is also possible to change reference numbers for each PID filter and to allocate separate ranges. From a practical standpoint, there may be cases where such an arrangement does not pose any problems.

For example, a case will now be considered where seven PID filters 50 to 56 having different reference numbers are arranged to be respectively connectable to 10 section filters (a case where a restriction in which j is set to 10 in Formula 1 is imposed).

In other words, a case will be considered where reference numbers are set as follows so that the PID filters 50 to 56 are sequentially connectable to section filters in ascending order of their section filter numbers.

$$s(50)s(51)=0; s(52)=s(53)=10; s(54)=20; s(55)=30;$$
$$s(56)=40 \quad \text{(Formula 4)}$$

In the same manner as described above, the numbers of section filters connectable to each PID filter can now be managed as relative numbers from the reference numbers. In the present example, the relative numbers of the section filters are 0 to 9.

Let us now assume that the PID filters 50 to 53 are to be respectively sequentially connected to 5 section filters, and the PID filters 54 to 56 are to be respectively sequentially connected to 10 section filters in ascending order of their numbers.

More specifically, the PID filter 50 is connectable to section filters whose relative numbers are 0 to 4;

next, the PID filter 51 is connectable to section filters whose relative numbers are 5 to 9;

next, the PID filter 52 is connectable to section filters whose relative numbers are 0 to 4;

next, the PID filter 53 is connectable to section filters whose relative numbers are 5 to 9;

next, the PID filter 54 is connectable to section filters whose relative numbers are 0 to 9;

next, the PID filter 55 is connectable to section filters whose relative numbers are 0 to 9; and the PID filter 56 is connectable to section filters whose relative numbers are 0 to 9.

Respectively expressing the relative numbers using absolute numbers results in the following description.

The PID filter 50 is connectable to section filters whose absolute numbers are 0 to 4;

the PID filter 51 is connectable to section filters whose absolute numbers are 5 to 9;

the PID filter 52 is connectable to section filters whose absolute numbers are 10 to 14;

the PID filter 53 is connectable to section filters whose absolute numbers are 15 to 19;

the PID filter 54 is connectable to section filters whose absolute numbers are 20 to 29;

the PID filter 55 is connectable to section filters whose absolute numbers are 30 to 39; and the PID filter 56 is connectable to section filters whose absolute numbers are 40 to 49.

In other words, by devising ways to allocate a reference number to each PID filter, extremely rare cases (where connection to a large number of section filters is required at two or more PID filters) may be accommodated to a certain extent.

In this case, "devising ways" refers to, for example, overlapping all of or a portion of ranges of numbers (absolute numbers) of section filters connectable at two or more PID filters, or allocating ranges that are totally independent (free of overlapping).

As shown above, the fact that imposing restrictions such as Formula 1 or Formula 2 does not pose any problems from a practical standpoint has been described using specific examples of a case where the same reference number s(n) is used for each PID filter and a case where different reference numbers are used for each PID filter.

As described above, it is conceivable that even if the ranges of section filters connectable to a PID filter are restricted to a certain extent, problems of impaired flexibility with respect to various broadcast modes do not arise.

Furthermore, according to the present invention, by presetting reference numbers as in the above-described specific examples, management of subsequent section filters can be performed using relative numbers of the section filters. An advantageous effect thereof will be described separately following the descriptions of the respective embodiments.

A description will now be given on a circuit configuration for realizing the restriction typified by Formula 1 with a filtering apparatus.

FIG. 1 is a block diagram showing a first digital broadcast receiving apparatus incorporating a filtering apparatus according to the present invention.

FIG. 2 is a block diagram showing a specific configuration example of a section filter portion 20 according to the first embodiment of the present invention which is to be applied to the filtering apparatus shown in FIG. 1.

In FIG. 1, at least a PID filter portion 24, a section filter portion 20, a host processor 25, a video decoder 27, an audio decoder 28 and a data bus 32 are formed on a same chip 33.

As shown in FIG. 1, stream data at a radio frequency is inputted to a tuner 22 via an antenna 21. The tuner 22 converts an inputted radio frequency signal into a baseband signal and outputs the same to a demodulator 23. The demodulator 23 performs demodulation processing on the inputted baseband signal and outputs a TS constituted by TS packets to the PID filter portion 24. The demodulation processing includes, for example, at least any of conversion from an analog signal to a digital signal, multiplex demodulation in a case where a received signal is multiplex-modulated, and other error correction processing or the like. With a receiving apparatus mounted with two tuners (also referred to as a double tuner) or more than two tuners, it is assumed that the antenna 21 or another antenna, not shown, is similarly connected to the other tuners.

From the TS packet including a preset PID, the PID filter portion 24 outputs (or transmits) desired data constituting all of or part of the TS packet to a subsequent stage block. In other words, the PID filter portion 24 includes at least one or more PID filters (or PID filter conditions), and set to each PID filter is at least a PID value included in the filtering object TS packet as a filter condition. Each of the PID filters compares the set filter condition with the PID value (comparison data) included in the inputted TS packet, and when the PID value satisfies the filter condition, filters a required data part (all or a part of the TS packet) and outputs the same as first filtered data to a subsequent stage block. A filter condition is constituted by at least one or more types of conditions including an AND condition (also referred to as reference data), a MASK condition (also referred to as mask data), and the like. For example, in a case where only an AND condition exists, the filter condition is satisfied when a value set in the AND condition and the comparison data match each other. In a case where two conditions, namely, an AND condition and a MASK condition exist, the filter condition is satisfied when a value set in the AND condition and part of the comparison data not excluded by the MASK condition match each other.

Subsequent stage blocks include the video decoder 27, the audio decoder 28 and the host processor 25 (in some cases, via the section filter portion 20). The PID filter portion 24 filters a part that at least includes data (desired data) required by these subsequent stage blocks as first filtered data from the TS packet and outputs the same. Hereinafter, data desired by the video decoder 27 shall be referred to as video data, data desired by the audio decoder 28 as audio data, and among data desired by the host processor 25, those which can be filtered using only the PID filter portion 24 shall be referred to as private data and those which can be filtered by additionally using the section filter portion 20 shall be referred to as section data.

A TS packet including video data, audio data or private data is filterable only by the PID of the TS packet. First filtered data including these data from the PID filter portion 24 is supplied to the video decoder 27, the audio decoder 28 or the host processor 25 via the data bus 32 and via a dedicated buffer region provided in the memory 26. Although not illustrated, it is also possible to output data from the PID filter portion 24 directly to a subsequent stage blocks without passing the data through the memory 26, and to cause each subsequent stage block to acquire the data.

The video decoder 27 decodes the acquired video data, and outputs resulting video information to a back end processor (BEP) 29. The back end processor 29 performs various types of image processing such as color correction on the video information and causes the resulting information to be displayed on a monitor 30.

The audio decoder 28 decodes acquired audio data, and causes a speaker 31 to reproduce the resulting audio information from a speaker 31.

If required, private data may be decoded by the host processor 25 and the resulting text information or the like may be superimposed on video information to be outputted.

As for TS packets on which section data is multiplexed, the PID filter section 24 outputs the number of a PID filter provided with a filter condition that is satisfied by the PID of the TS packet including the section data (i.e., the number of a PID filter that had detected that the value of the PID satisfies the set filter condition) together with the filtered TS packet to the section filter portion 20.

The section filter portion 20 includes at least one or more section filters (or section filter conditions) configured to filter all or a part of section data multiplexed on the TS packet. At least one or more types of values (an AND condition, a MASK condition or the like) for identifying unique information (a table number, a version number or the like) included in filtering object section data is respectively set to each section filter as a filter condition.

As shown in FIG. 2, the section filter portion 20 respectively receives the number of the PID filter that detected the PID of the TS packet to be filtered by the PID filter portion 24 as a PID filter number n and the filtered TS packet as first filtered data.

The section filter portion 20 includes a connection information register portion 2, a determination portion 8, a reference number register portion 9, a section filter 10 and a data input/output portion 13. For ease of explanation, illustrated as an example is a case where the number of mounted PID filters and the number of mounted section filters are both 128 and are respectively identified using numbers (absolute numbers) 0 to 127, and the capacity (number of bits) of the connection information register of each PID filter is set to 64 bits (in other words, the number of section filters connectable per PID filter is limited to a maximum of 64). In other words, while a conventional case required that the capacity be set to at least 128 bits, by imposing the restriction of Formula 2, the required capacity is now ½ or 64 bits (the shaded area of the connection information register portion 2 represents a total capacity part to be reduced).

Connection information of each PID filter is retained in the connection information register portion 2, which includes a connection information register allocated to (associated with) each of the PID filters. Connection information (value of the connection information register) allocated to number n of the PID filter that is outputted from the PID filter portion 24 is selected and outputted to the determination portion 9.

The determination portion 8 includes a bit number decoder 4 and an added value judgment circuit 6.

At the bit number decoder 4, a relative number of a section filter connected to the number n PID filter is obtained from connection information outputted from the connection information register portion 2.

More specifically, the bit number decoder 4 sequentially identifies a position number bp of a bit having a value of "1" from connection information received from the connection information register portion 2, and outputs the identified number bp for each bit to the added value judgment portion 6. For example, when the value of an ith bit position is expressed as bp(i), assuming that connection information outputted from the connection information register portion 2 is bp(0)=0, bp(1)=0, bp(2)=1, bp(3)=0, bp(4)=1, bp(5)=1, bp(6)=0, ..., output from the bit number decoder 4 is obtained as 2, 4, 5 . . . .

In other words, with the bit number decoder 4, only relative numbers of section filters already connected to a PID filter are obtained (notified). This arrangement enables the comparison operation with unconnected section filters (or section filter conditions) to be omitted (eliminated), and, as a result, the time required by filtering processing can be reduced. This can be described as an advantage (merit) of configuring the connection information register as shown in FIGS. 4A to 4C.

At the added value judgment circuit 6, the absolute numbers of section filters connected to the number n PID filter is obtained from the relative numbers and the reference number s(n) that becomes the output from the reference number register portion 8.

Reference numbers of section filters connectable to each PID filter are retained in the reference number register portion 9, which includes a reference number register allocated to (associated with) each PID filter. In the example shown in FIG. 2, section filters connectable to the number n PID filter are restricted to the 64 section filters that are consecutive from a reference number s(n) thereof (any one of the numbers in the range 0 to 127 which section filter numbers may take). The restricted quantity is equivalent to the maximum quantity identifiable by one connection information register. In the present example, since the capacity of the connection information register of each PID filter is set to 64 bits and the relative number of a section filter is identified by the position (number) of each bit, a maximum of 64 section filters are connectable.

The section filter 10 includes a condition storage portion 11 and a condition comparison portion 12.

Figure 7:
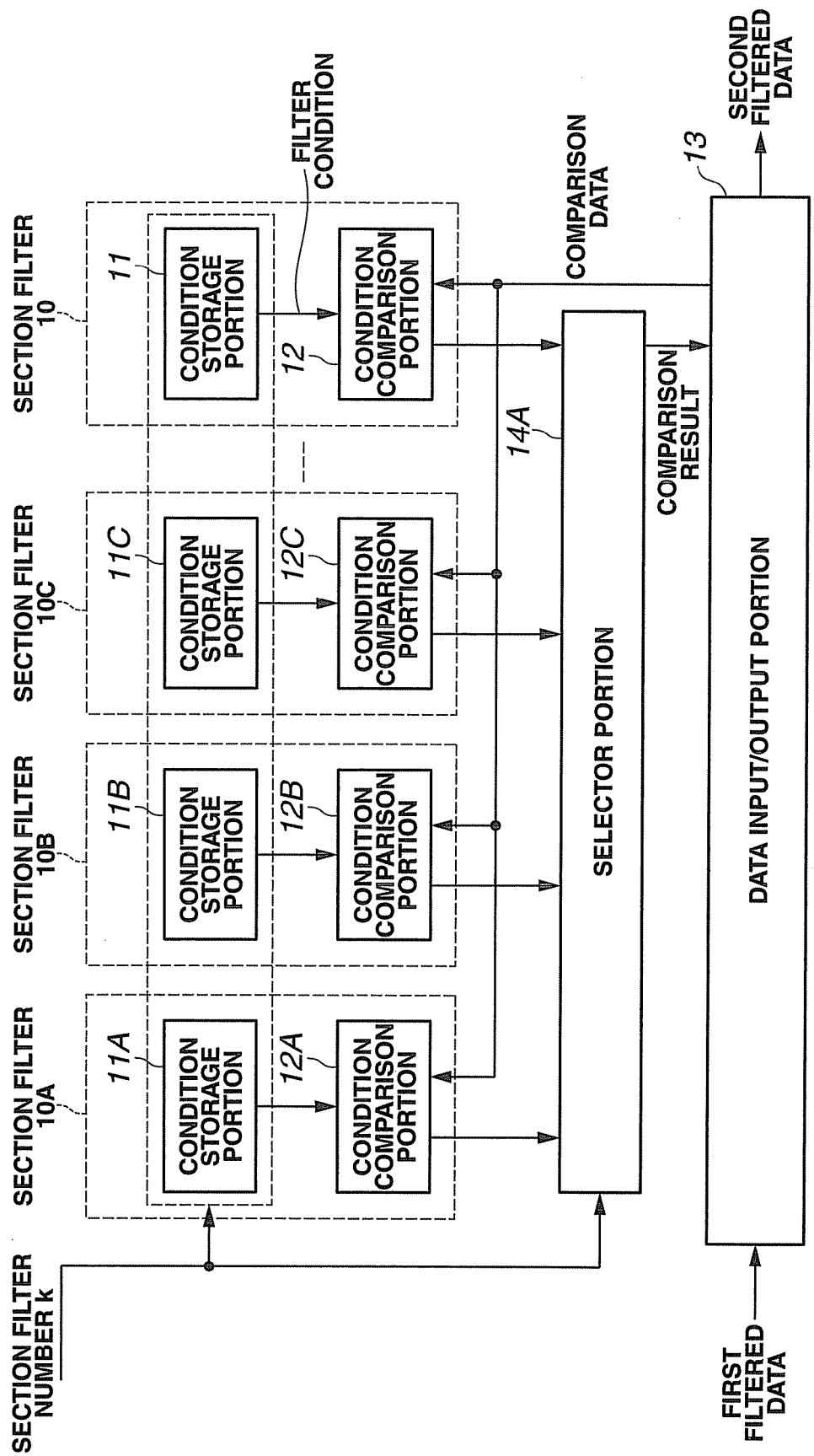
FIG. 7 is a block diagram showing a configuration example in a case where two or more section filters are mounted.

A section filter portion 20 mounted with a plurality of section filters can be realized by configuring the section filter 10 so that, as shown in FIG. 7, section filters corresponding to the number of those mounted are disposed in parallel and, in accordance with a section filter number k outputted from the determination portion 8, a selector portion 14A selects a comparison result required by the data input/output portion 13 based on the outputs of the respective section filters (10A, 10B, 10C . . . , 10).

Alternatively, as shown in FIG. 8, a section filter portion 20 mounted with a plurality of section filters (which can be compared with filter conditions) can also be realized by arranging only condition storage portions 11 corresponding to the number of mounted section filters in parallel, providing at least one condition comparison portion 12 and, in accordance with a section filter number k outputted from the determination portion 8, switching filter conditions required by the condition comparison portion 12 from the outputs of the respective condition storage portions (11A, 11B, 11C . . . , 11).

In the case of FIG. 8, section filter numbers are to be used to identify filter conditions stored in each condition storage portion. In other words, a filter number can be used as a number to identify a filter condition used by a filter or associated to a filter. Therefore, when an expression such as "m-number of section filters are mounted" is used, two configuration examples of the section filter portion 20 are conceivable, namely, a configuration where m-number of parts that include the condition storage portion 11 and the condition comparison portion 12 exist (FIG. 7) and a configuration where only m-number of condition storage portions 11 exist (FIG. 8).

While the present invention includes both configurations, for ease of explanation, hereinafter, it shall be assumed that descriptions will be given on the premise of the configuration shown in FIG. 8 unless otherwise noted.

In addition, in FIGS. 7 and 8, the condition storage portions (11A, 11B, 11C, . . . , 11) disposed in parallel need only be logically distinguishable from each other. For example, if filter conditions are to be stored in a storage element such as a memory, it is possible to use a single memory having a physical capacity (number of bits) of N as J-number of memories each having a logical capacity of N/J. The present invention includes such an arrangement and does not limit the physical quantity of storage elements such as memories.

Furthermore, in a section filter configuration such as that shown in FIG. 8 where one condition comparison portion is provided, when one storage element is shared (the capacity thereof is logically divided up and used) at least for each of the respective types of filter conditions (an AND condition, a MASK condition or the like) at all condition storage portions, the selector portion 14B will no longer be needed. Consequently, the configuration becomes equivalent to the configuration of the section filter 10 shown in FIG. 2. In other words, the section filter 10 shown in FIG. 2 may be described as encompassing a configuration in which two or more section filters are mounted to the section filter portion 20.

The condition comparison portion 12 compares a filter condition from the condition storage portion 11 with comparison data from the data input/output portion 13, and when the comparison data satisfies the filter condition, outputs the number of the filter (or the filter condition thereof) to which the filter condition is associated as a comparison result to the data input/output portion 13.

The data input/output portion 13 accepts first filtered data outputted from the PID filter portion 24 as an input, extracts all or a part of the first filtered data as data required for section filtering, and outputs the same as comparison data to the section filter 10.

In addition, in accordance with the comparison result from the section filter 10, the data input/output portion 13 filters a data part (all or a part of the TS packet) that includes all or a part of the section data from the first filtered data, and outputs the same as second filtered data to the data bus 32.

The second filtered data outputted from the section filter portion 20 passes through the data bus 32, and is supplied to the host processor 25 via a section buffer provided on the memory 26. Even in this case, although not illustrated, it is also possible to output data from the section filter portion 20 directly to the host processor 25 without passing the data through the memory 26, and to cause the host processor 25 to acquire the data.

As seen, in the present embodiment, the method of handing over filtered data outputted from the PID filter portion 24 and the section portion 20 to a subsequent stage block is not limited.

The host processor 25 acquires section data, and uses the data to perform various kinds of processing. For example, if the content of section data is a PMT (program map table) (a type of SI that lists PIDs of TS packets on which information constituting a program is multiplexed; in some cases, distinguished from SI as a type of PSI (program specific information)), the host processor 25 sets the values of a PID of a TS packet on which various information such as video and audio is multiplexed on the PID filter portion 24. In addition, in the case where information multiplexed on a TS packet is section data, a section filter that causes detection of the section data is selected, and according to the number of the selected section filter (or filter condition), the value of the connection information register for a PID filter that causes detection of a PID is changed and, further, a filter condition that identifies the section data to be selected is set to the section filter portion 20 (or the condition storage portion 11).

Setting filter conditions to the PID filter portion 24 and the section filter portion 20 may be performed via a path directly connected from a host processor 25, not shown, or via the data bus 32. In the present invention, the setting path is not limited.

The PID filter portion 24 can also be primarily constituted by a condition storage portion, a condition comparison portion and a data input/output portion in the same manner as shown in FIG. 7 or FIG. 8. However, since components thereof do not affect the present invention, the components will not be illustrated. It may be added that when an expression such as "m-number of PID filters are mounted" is used, two configuration examples of the PID filter portion 24 are conceivable, namely, a configuration where m-number of parts that include the condition storage portion and the condition comparison portion exist and a configuration where only m-number of condition storage portions exist.

Now, a method of use of the connection information register according to the present embodiment (FIG. 2) will be described in greater detail using specific examples.

FIGS. 9A to 9C show a relationship between the number of bits (bit numbers) of a connection information register allocated to a number n PID filter of the connection information register portion 2 and numbers of section filters (section filter numbers) connectable to the PID filter according to the present embodiment, and present an example in which the connection information register is constituted by 64 bits from the 0th to 63rd bit.

FIG. 9A represents a general form in which section filter numbers are allocated in ascending order as relative numbers from a reference number s(n) to bit numbers of the connection information register. In other words, a section filter number (absolute number) may simply be determined as a sum of the bit number of the connection information register and the reference number s(n).

FIG. 9B is an example where reference number s(n)=0, and FIG. 9C is an example where reference number s(n)=96.

At the determination portion 8 shown in FIG. 2, as shown in FIGS. 9B and 9C, the absolute number of a section filter to be used for section filtering is determined from an output value (connection information) of the connection information register portion 2 and an output value (reference number s(n)) of the reference number register portion 9.

Figure 11:
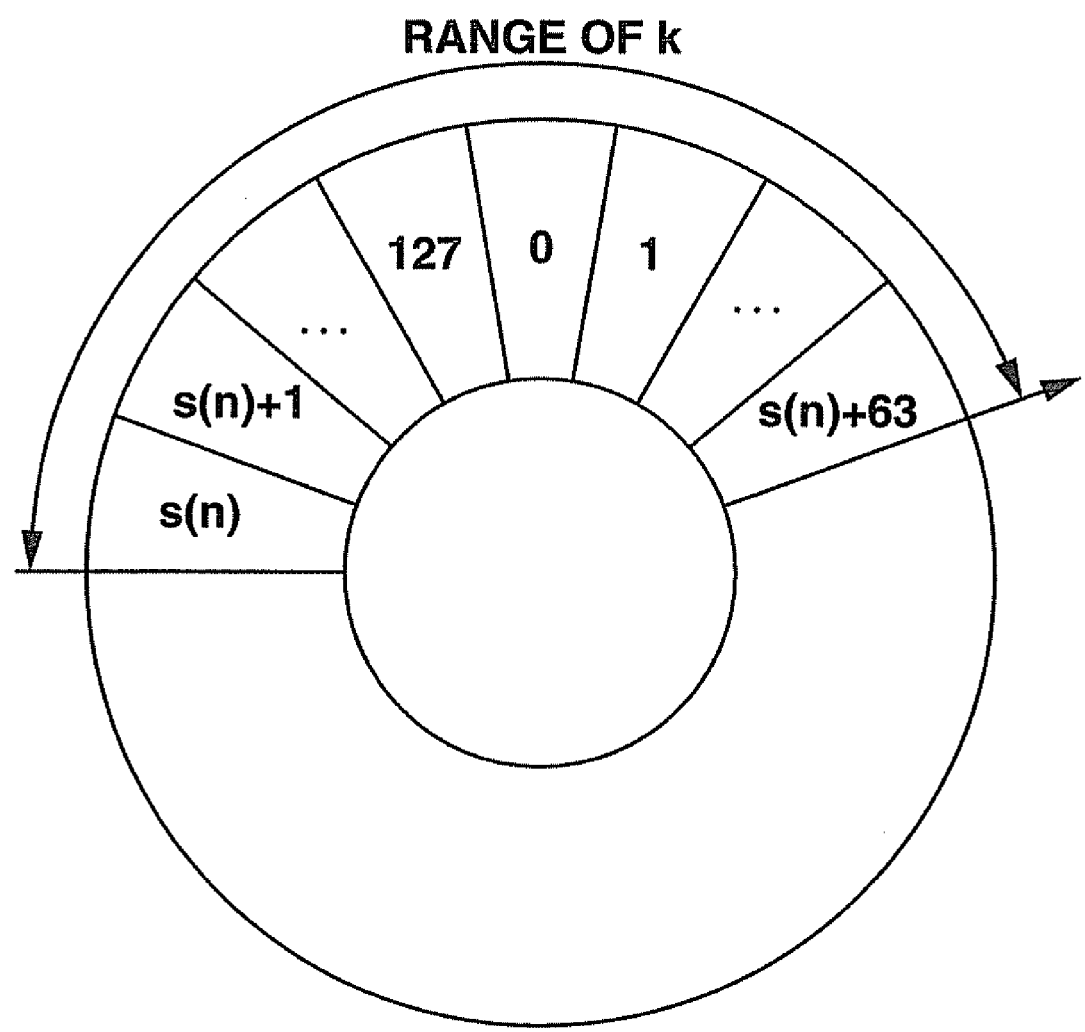
FIG. 11 is a diagram showing an example of a range of connectable section filters according to the first embodiment.

FIG. 9C also serves as an example where connectable section filters are allocated to the PID filter using the continuity shown in FIG. 11.

The present invention does not limit the association between the bit numbers of the connection information register and section filter numbers to an ascending order as shown in FIG. 9A described above.

FIGS. 10A to 10C show examples where a descending order is employed.

In this case, an ascending order refers to a method of allocation in which section filter numbers are allocated so as to increase in the direction in which bit numbers increase, while a descending order refers to a method of allocation in which section filter numbers are allocated so as to increase in the direction in which bit numbers decrease.

FIG. 10A is a replication of FIG. 9A shown so as to facilitate understanding the difference from an ascending order.

FIG. 10B shows an example where section filter numbers are allocated so as to increase from s(n) to s(n)+63 with respect to bit numbers of a connection information register arranged from 63 to 0, and FIG. 10C shows an example where section filter numbers are allocated so as to increase from s(n)−63 to s(n) with respect to bit numbers of a connection information register arranged from 63 to 0.

As shown, in the present invention, it is possible to apply both an ascending order and an descending order to the method of allocating bit numbers of connection information registers and section filter numbers, and the present invention includes both applications.

Second Embodiment

In the first embodiment, a reference number can be set for each PID filter, and as specific examples thereof, a case where the reference number is set to be the same among PID filters to be connected to an input port and a case where different reference numbers are set among PID filters have been described. The second embodiment focuses attention on the former specific example and is arranged so that a reference number can be set for each input port.

In other words, the restriction expressed by Formula 5 below is imposed between a number x input port and a number k of a section filter connectable to an arbitrary PID filter to be connected thereto.

$$s(x) \leq k < s(x)+j \quad \text{(Formula 5)},$$

where j denotes the quantity of connectable section filters which becomes a reference value for determining the capacity (number of bits) of the connection information register. s(x) denotes a reference number allocated to the number x input port.

In other words, the number k of section filters connectable to a PID filter to be connected to the number x input port is to be uniformly restricted to a range of numbers offset by j from the reference number s(x).

Although a description should be given here using a specific example, equivalents of a specific example of the second embodiment where PID filters are connected to one input port may be obtained by replacing s(n) with s(x) in the specific example of the first embodiment which uses Formula 2, and with the example using Formula 3, by assuming that the PID filters 50 to 56 are all connected to the input port 0 and replacing Formula 3 with Formula 6 provided below.

$$s(0)=64 \quad \text{(Formula 6)}$$

Furthermore, with the example using Formula 4, an equivalent of a specific example of the second embodiment where PID filters are connected to two or more input ports may be obtained by assuming that the PID filters 50 and 51 are connected to the input port 0, the PID filters 52 and 53 are connected to the input port 1, the PID filter 54 is connected to the input port 2, the PID filter 55 is connected to the input port 3 and the PID filter 56 is connected to the input port 4, and by replacing Formula 4 with Formula 7 provided below.

$$s(0)=0; s(1)=10; s(2)=20; s(3)=30; s(4)=40 \qquad \text{(Formula 7)}$$

Accordingly, a detailed description using a specific example of Formula 5 is hereby omitted.

FIG. 12 is a block diagram showing a specific configuration example of a section filter portion 20 according to the second embodiment of the present invention which is to be applied to the filtering apparatus shown in FIG. 1. Like components to those shown in FIG. 2 are assigned like reference numerals.

The difference from FIG. 2 (first embodiment) lies in the fact that the input to the reference number register portion 8 has been changed from the PID filter number n to the input port number x and an output therefrom is now reference number s(x).

The operation performed at the reference number register portion 8 which outputs a number associated with an inputted number is no different from that of the first embodiment.

However, since only a maximum of about 10 input ports are generally mounted to a receiving apparatus, the number of input ports is significantly small compared to the number of mounted PID filters. In other words, compared to the first embodiment, a smaller quantity (total capacity) of reference number registers that retain reference numbers at the reference number register portion 8 shall suffice. Thus, the second embodiment enables the circuit size of the reference number register portion 8 to be smaller than that of the first embodiment.

The description presented in FIG. 12 assumes that the number of input ports to be mounted is set to 8 and that the input ports are respectively identified by numbers 0 to 7.

In the first embodiment, the circuit size of the reference number register portion 8 can be reduced in the same manner by imposing a restriction on the number of PID filters for which a reference number can be set or, in other words, imposing a restriction on the number of PID filters connectable to a section filter, and the present invention also includes this arrangement. However, since the number of PID filters connectable to a section filter will be smaller in comparison to the second embodiment, there is a risk that flexibility may be slightly impaired.

Now, a method of use of the connection information register according to the present embodiment (FIG. 12) will be described in greater detail using specific examples.

Figures 13A, 13B, 13C, 14:
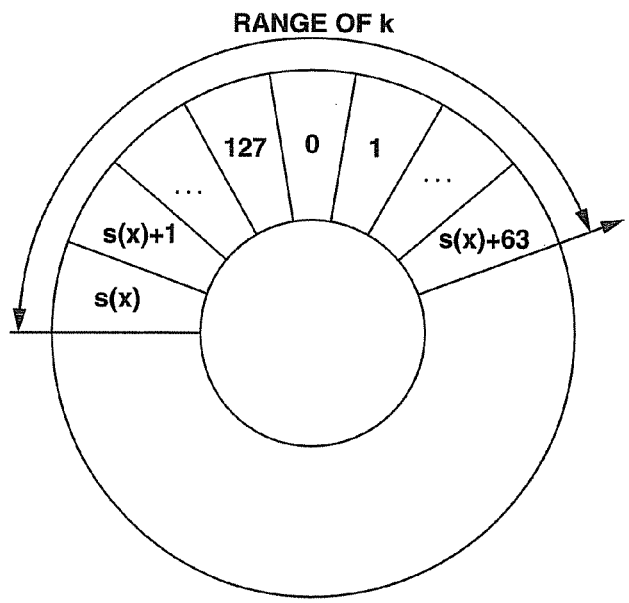
FIGS. 13A to 13C are diagrams showing a relationship between bit numbers and section filter numbers of a connection information register according to the second embodiment.
FIG. 14 is a diagram showing an example of a range of connectable section filters according to the second embodiment.

FIGS. 13A to 13C show a relationship between the number of bits (bit numbers) of a connection information register allocated to a PID filter to be connected to a number x input port of the connection information register portion 2 and numbers of section filters (section filter numbers) connectable to the PID filter according to the present embodiment, and present an example in which the connection information register is constituted by 64 bits from the 0th to 63rd bit.

FIG. 13A represents a general form in which section filter numbers are allocated in ascending order as relative numbers from a reference number s(x) to bit numbers of the connection information register. In other words, a section filter number (absolute number) may simply be determined as a sum of the bit number of the connection information register and the reference number s(x).

FIG. 13B is an example where reference number s(x)=0, and FIG. 13C is an example where reference number s(x)=96.

At the determination portion 8 shown in FIG. 12, as shown in FIGS. 13B and 13C, the absolute number of a section filter to be used for section filtering is determined from an output value (connection information) of the connection information register portion 2 and an output value (reference number s(x)) of the reference number register portion 9.

FIG. 13C also serves as an example where connectable section filters are allocated to the PID filter using the continuity shown in FIG. 14.

Since the same operations as in the first embodiment are performed at the other parts assigned like reference numerals to FIG. 2 and have already been described, descriptions thereof will be hereby omitted.

Third Embodiment

The first embodiment is arranged so that a reference number can be set for each PID filter, and the second embodiment is arranged so that a reference number can be set for each input port.

The third embodiment is arranged so that both are selectable in order to enable a receiving apparatus or a filtering apparatus to accommodate broadcast modes with greater flexibility.

Figure 15:
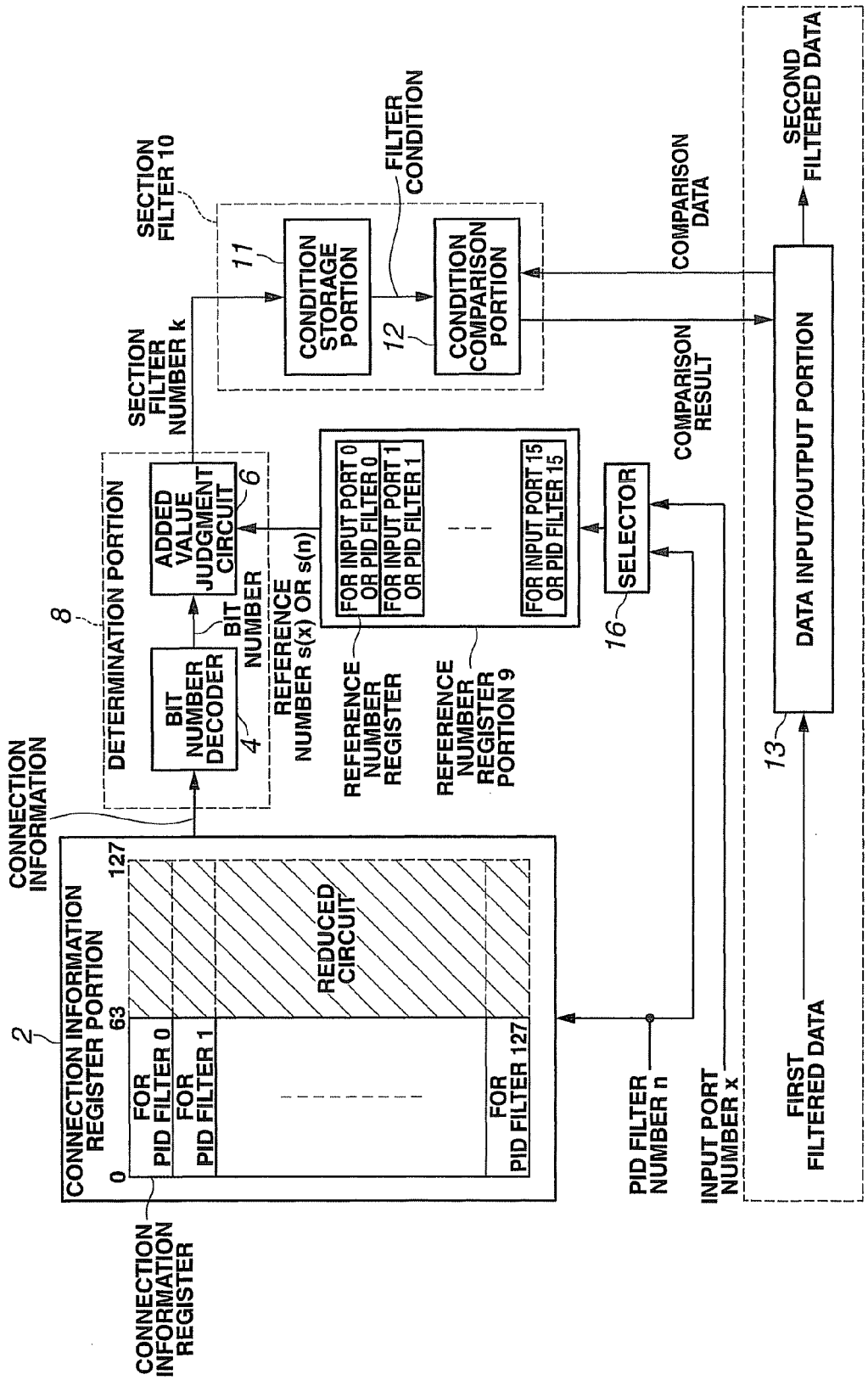
FIG. 15 is a block diagram showing a specific configuration of the section filter portion 20 shown in FIG. 1 according to a third embodiment.

FIG. 15 is a block diagram showing a specific configuration example of a section filter portion 20 according to the third embodiment of the present invention which is to be applied to the filtering apparatus shown in FIG. 1. Like components to those shown in FIG. 2 are assigned like reference numerals.

The differences from FIG. 2 (first embodiment) lies in the fact that the input to the reference number register portion 8 has been changed to either a PID filter number n or an input port number x selected at the selector 16, and that an output therefrom is now either reference number s(n) or s(x) depending on input.

For example, in a case where the capacity of the reference number register portion 8 is arranged such that only reference numbers equal to or less than the number of mounted PID filters or equal to the number of mounted input ports are retainable in order to suppress the circuit size thereof, the circuit size of the reference number register portion 8 can be suppressed in comparison to that of the first embodiment and broadcast modes can be flexibly accommodated when receiving a broadcast that only requires a small number of PID filters connectable to a section filter at the receiving apparatus by selecting a PID filter number n as an input to the reference number register portion 8 at the selector 16, and conversely, when receiving a broadcast that requires a large number of PID filters connectable to a section filter at the receiving apparatus, by selecting an input port number x as an input to the reference number register portion 8 at the selector 16.

The description presented in FIG. 15 assumes that the number of reference number registers that can be shared by input ports and PID filters of the same number is set to 16, and that input port numbers or PID filter numbers from 0 up to 15 can be accommodated.

As for other parts assigned like reference numerals to FIG. 2, the same operations as in the first embodiment are performed when the PID filter number n is selected as an input to the reference number register portion 8 at the selector 16 and the same operations as in the second embodiment are performed when the input port number x is selected as an input to the reference number register portion 8 at the selector 16. Since respective descriptions have already been given, descriptions thereof will be hereby omitted.

Fourth Embodiment

For the first to third embodiments, descriptions were given using a case as an example where the present invention is applied to a filtering apparatus included in the receiving apparatus shown in FIG. 1.

For the fourth embodiment, a description will be given of a case as an example where the present invention is applied to a filtering apparatus included in a receiving apparatus having a different block configuration from that shown in FIG. 1.

Figure 16:
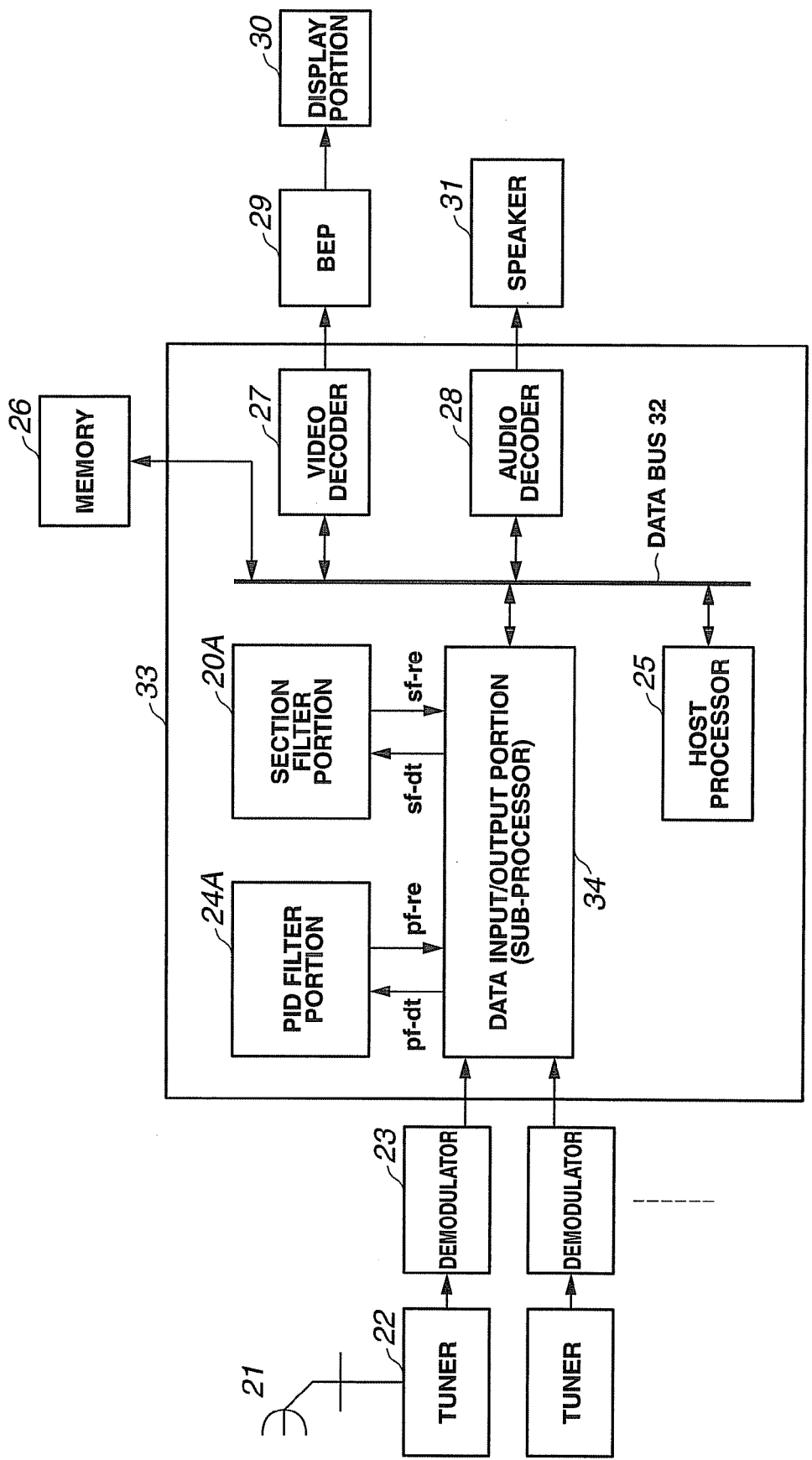
FIG. 16 is a block diagram showing a second digital broadcast receiving apparatus incorporating a filtering apparatus according to the present invention.

FIG. 16 is a block diagram showing a second digital broadcast receiving apparatus incorporating a filtering apparatus according to the present invention. Like components to those shown in FIG. 1 are assigned like reference numerals.

The difference from FIG. 1 (first to third embodiments) lies in the fact that a PID filter portion 24A and a section filter portion 20A are connected to a data input/output portion 34.

As was described for the first embodiment, the PID filter portion 24 and the section filter portion 20 shown in FIG. 1 internally include a data input/output portion configured to filter all or a part of input data and to output the same.

Shown in FIG. 16 is a result of integrating the two data input/output portions and arranging the same as an external block of the PID filter portion and the section filter portion. Accordingly, a specific configuration example of the section filter portion 20A applied to the receiving apparatus constitutes the fourth embodiment.

A specific block diagram of the fourth embodiment can be obtained by omitting the data input/output portion 13 (at least the part enclosed by the dashed line) from FIG. 2 according to the first embodiment, FIG. 12 according to the second embodiment, or FIG. 15 according to the third embodiment. In other words, this illustrates that the present invention can also be applied to a filtering apparatus in which the PID filter portion 24A or the section filter portion 20A is controlled from an external data input/output portion 34.

Consequently, the integrated data input/output portion 34 is at least provided with the following functions.

1. Receiving TS inputted from one or more input ports and identifying TS packets.

2. Extract information (at least any one of a PID, an input port number or the like) identifying a TS packet on which desired data is multiplexed from identified TS packets and outputting the same as comparison data pf-dt to the PID filter portion 24A.

3. Receiving a comparison result pf-re outputted from the PID filter portion 24A and, in accordance to the value thereof, filtering desired data (corresponding to first filtered data) from the TS packets.

4. If the desired data is video data, audio data or private data, outputting a part at least including such data to the data bus 32.

5. If the desired data is section data, extracting information (at least any one of a table number, a version number or the like) identifying the section data and outputting the same as comparison data sf-dt to the section filter portion 20A.

6. Receiving a comparison result sf-re outputted from the section filter portion 20A and, in accordance to the value thereof, outputting a part at least including the section data (corresponding to second filtered data) to the data bus 32.

In the same manner as in FIG. 1, it is assumed that filter conditions to condition storage portions respectively included in the PID filter portion 24A and the section filter portion 20A are set in advance (before commencing filtering of desired data) through a path, not shown, from the host processor 25, a path via the data input/output portion 34, or the like.

As seen, the present invention can also be applied to a filtering apparatus in which the PID filter portion 24A or the section filter portion 20A is controlled from an external data input/output portion 34.

In other words, it is shown that the present invention is applicable to a filtering apparatus having a configuration in which the data input/output portion 34 is replaced by a processor (a sub-processor that is separate from the host processor) and the PID filter portion 24A and the section filter portion 20A are mounted as support hardware (support circuit) of the processor. The present invention also includes the configuration.

In addition, the arrow indicating the connection between the data input/output portion (sub-processor) 34 and the data bus 32 is depicted as a two-way arrow in order to clarify that, since it is also possible to secure a working buffer in the memory 26 in the same way as the host processor, exchange of data (working data) is performed with the working buffer as needed. Working data can include all or a part of a TS packet, and the present invention includes such working data.

Since the same operations as in the first embodiment are performed at the other parts assigned like reference numerals to FIG. 1 and have already been described, descriptions thereof will be hereby omitted.

Fifth Embodiment

The first to fourth embodiments focused attention on connection information registers in PID filters with respect to section filters, and descriptions were given accordingly.

This is due to the fact that the present invention has been made with a focus on connection information existing between at least two or more mounted filters. However, with a receiving apparatus or a filtering apparatus, two filters thereof are not necessarily limited to a PID filter and a section filter.

Although it has been described above that video data, audio data and private data can at least be filtered at a PID (PID filter portion), some broadcast modes require that a further identifier (or identifiable information) be compared and judged, and filtered in the same manner as with section data.

For example, under the MPEG-2 standard, video data, audio data and private data are multiplexed on a TS packet in a structure referred to as a PES (packetized elementary stream) that is separate from a section. Hereinafter, such data having a PES structure shall be referred to as PES data.

In the same manner as section data, it is possible to transmit two or more PES data with one TS packet or one PES data with two more TS packets.

With respect to video data, audio data and private data in broadcast modes of recent years, in many cases, only one PES data is transmitted by a TS packet of one PID. In other words, as described above, in most cases, only filtering by a PID is selectable.

However, there are broadcast modes in which two or more PES data are used to transmit two or more programs. In order to accommodate such broadcast modes, a receiving apparatus or a filtering apparatus may be mounted with a filter referred to as a PES filter that is used to filter PES data.

While a stream number (stream ID) is generally used as data (filter condition) for identifying desired PES data, there may be cases where filtering of various information such as a sub-stream number, time stamp information (PTS: presentation time stamp or DTS: decoding time stamp) or the like must be additionally accommodated.

For the fifth embodiment, an example of a case where the present invention is applied to a PES filter will be shown.

Figure 17:
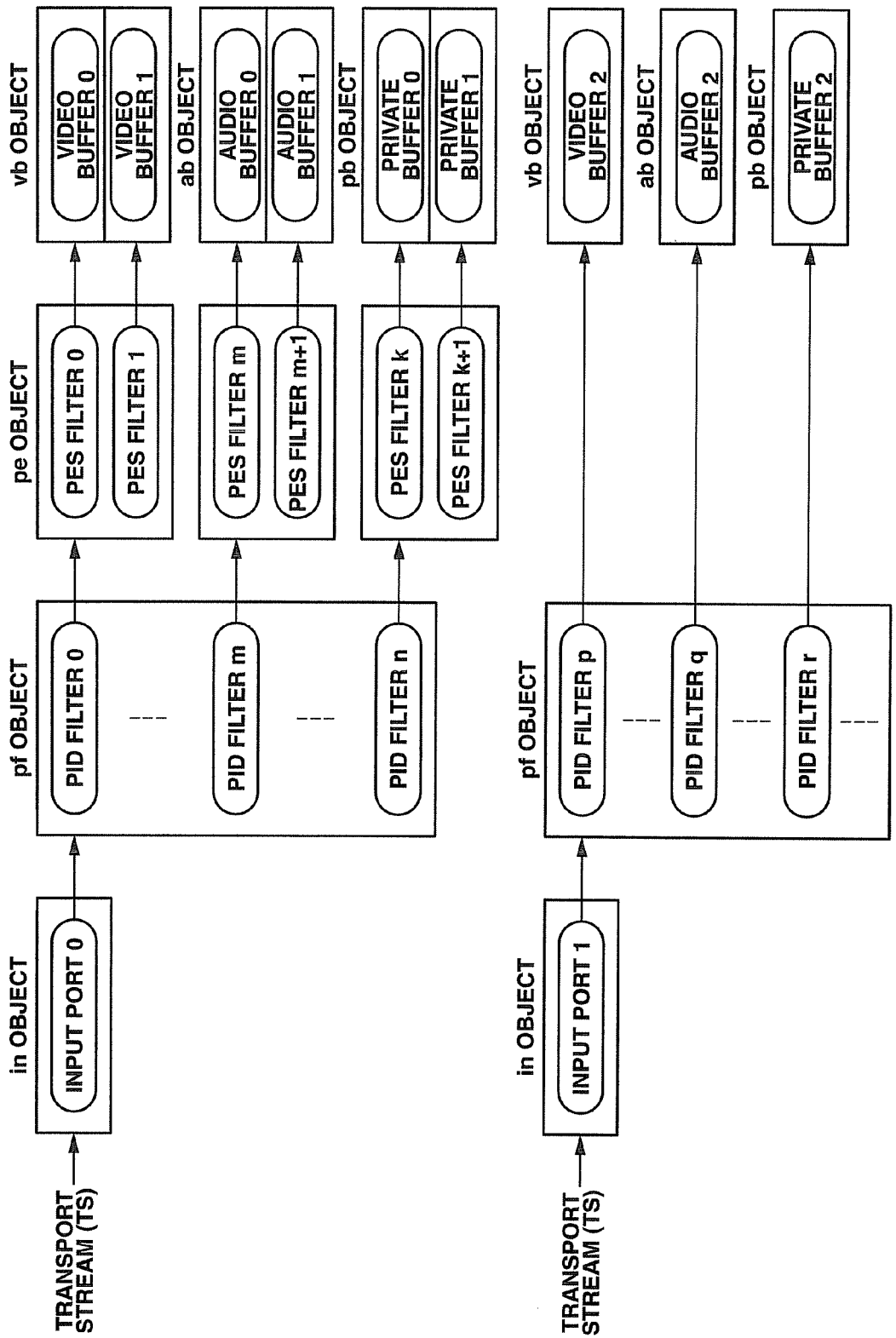
FIG. 17 is a diagram schematically showing a process flow of general PID filtering and PES filtering at a receiving apparatus.

FIG. 17 is a diagram schematically showing a process flow of general PID filtering and PES filtering in a receiving apparatus, and corresponds to FIG. 3 showing a processing flow of section filtering. Descriptions of like parts to FIG. 3 will be hereby omitted.

In FIG. 17, a total of six types of objects exist, namely, an in object, a pf object, a PES filter object (a pe object), a video buffer object (a vb object), an audio buffer object (an ab object) and a private buffer object (a pb object).

A PES filter, a video buffer, an audio buffer and a private buffer are included as processing mechanisms in a pe object, a vb object, an ab object and a pb object respectively.

A PES filter represents a mechanism configured to, when desired data is PES data, further filter PES data from TS packets filtered by a PID filter (to perform PES filtering); a video buffer is a mechanism configured to accumulate video data filtered by a PID filter or a PES filter; an audio buffer is a mechanism configured to accumulate audio data filtered by a PID filter or a PES filter; and a private buffer is a mechanism configured to accumulate private data filtered by a PID filter or a PES filter.

In addition, a case where a program that requires filtering of PES data through PES filtering is shown as an example of a TS (broadcast program) accepted at the input port 0, while a case where a program for which PES data can be filtered by PID filtering alone is shown as an example of a TS (broadcast program) accepted at the input port 1.

FIG. 17 shows that: PES filters 0 and 1 are specified by connection information as processing mechanisms to which data is to be transferred (connection destination) from the PID filter 0 to be connected to the input port 0; PES filters m and m+1 are specified by connection information as processing mechanisms to which data is to be transferred from the PID filter m to be connected to the input port 0; and PES filters k and k+1 are specified by connection information as processing mechanisms to which data is to be transferred from the PID filter n to be connected to the input port 0.

In addition, it is shown that: a video buffer 2 is specified by connection information as a processing mechanism to which data is to be transferred (connection destination) from the PID filter p to be connected to the input port 1; an audio buffer 2 is specified by connection information as a processing mechanism to which data is to be transferred from the PID filter q to be connected to the input port 1; and a private buffer 2 is specified by connection information as a processing mechanism to which data is to be transferred from the PID filter r to be connected to the input port 1.

At a pe object, for example, data filtered by and outputted from the PID filter 0 is inputted to each of the PES filters 0 and 1. The 0th and 1st PES filters each filter PES data having specific preset information (a stream number, time stamp information or the like). In the case where the connection information of the PES filter that performed filtering indicates a video buffer, the PES data is outputted as video data to a vb object in a subsequent stage.

In the case where the connection information indicates an audio buffer, the PES data is outputted as audio data to an ab object in a subsequent stage, and in the case where the connection information indicates a private buffer, the PES data is outputted as private data to a pb object in the subsequent stage.

For the present embodiment, attention will be focused on connection information that allocates (specifies) a connectable PES filter that becomes necessary for at least a PID filter to be connected to the input port 0 in the example described above, and an example of a case where the present invention is applied to a filtering apparatus or a receiving apparatus including the PES filter will be described.

In the same manner as in the first embodiment, the restriction expressed by Formula 1 is imposed between a number n PID filter and a number k of a PES filter connectable thereto.

Since an equivalent of a description of a case where the present invention is applied to a PES filter may be obtained by replacing "section filter" with "PES filter" in the description of the first embodiment, a description of Formula 1 will be hereby omitted.

Figure 18:
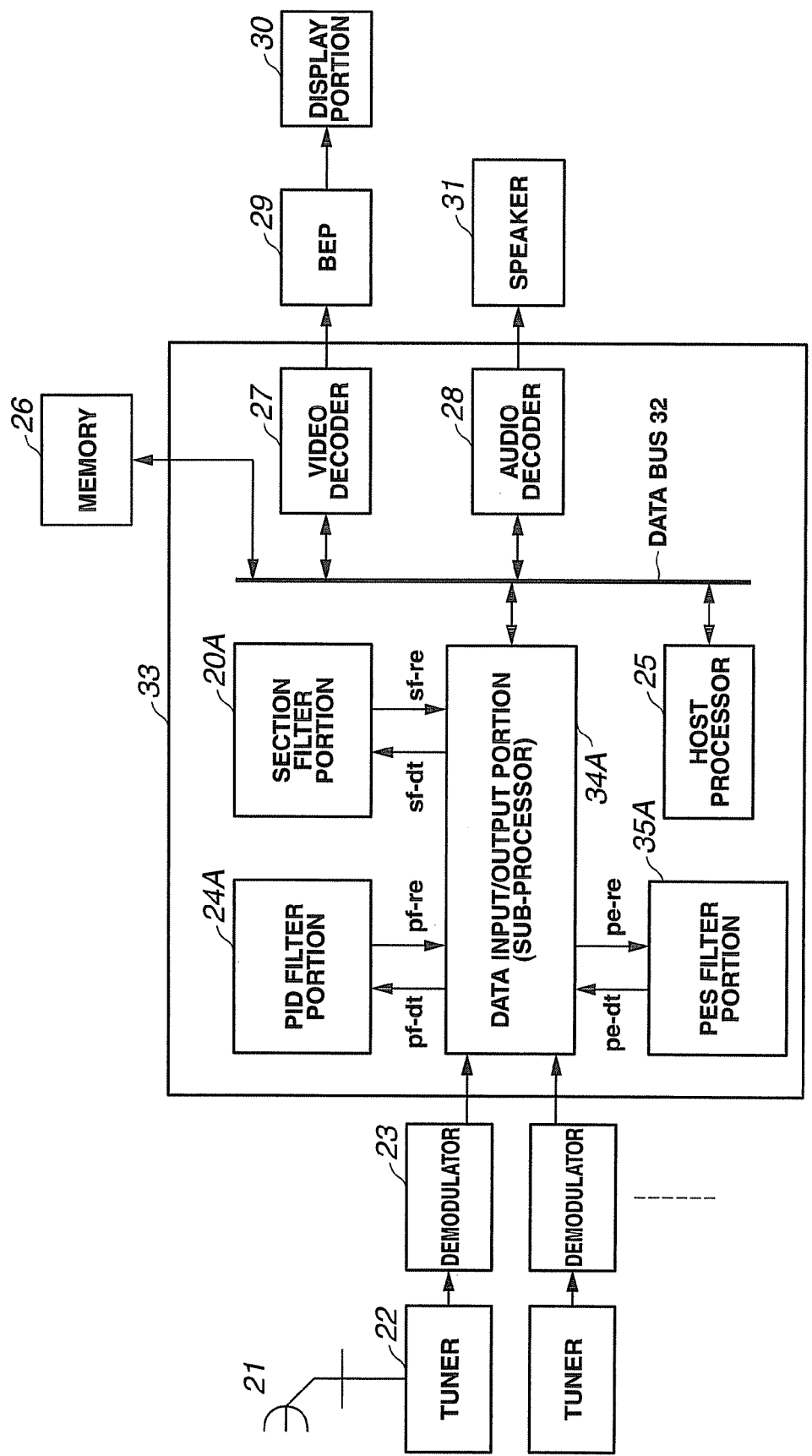
FIG. 18 is a block diagram showing a third digital broadcast receiving apparatus incorporating a filtering apparatus according to the present invention.

FIG. 18 is a block diagram showing a third digital broadcast receiving apparatus incorporating a filtering apparatus according to the present invention. Like components to those shown in FIG. 1 (or FIG. 16) are assigned like reference numerals.

The difference from FIG. 16 lies in the fact that, in addition to the filter portions of the PID filter portion 24A and the section filter portion 20A, a PES filter portion 35A is further provided.

Figure 19:
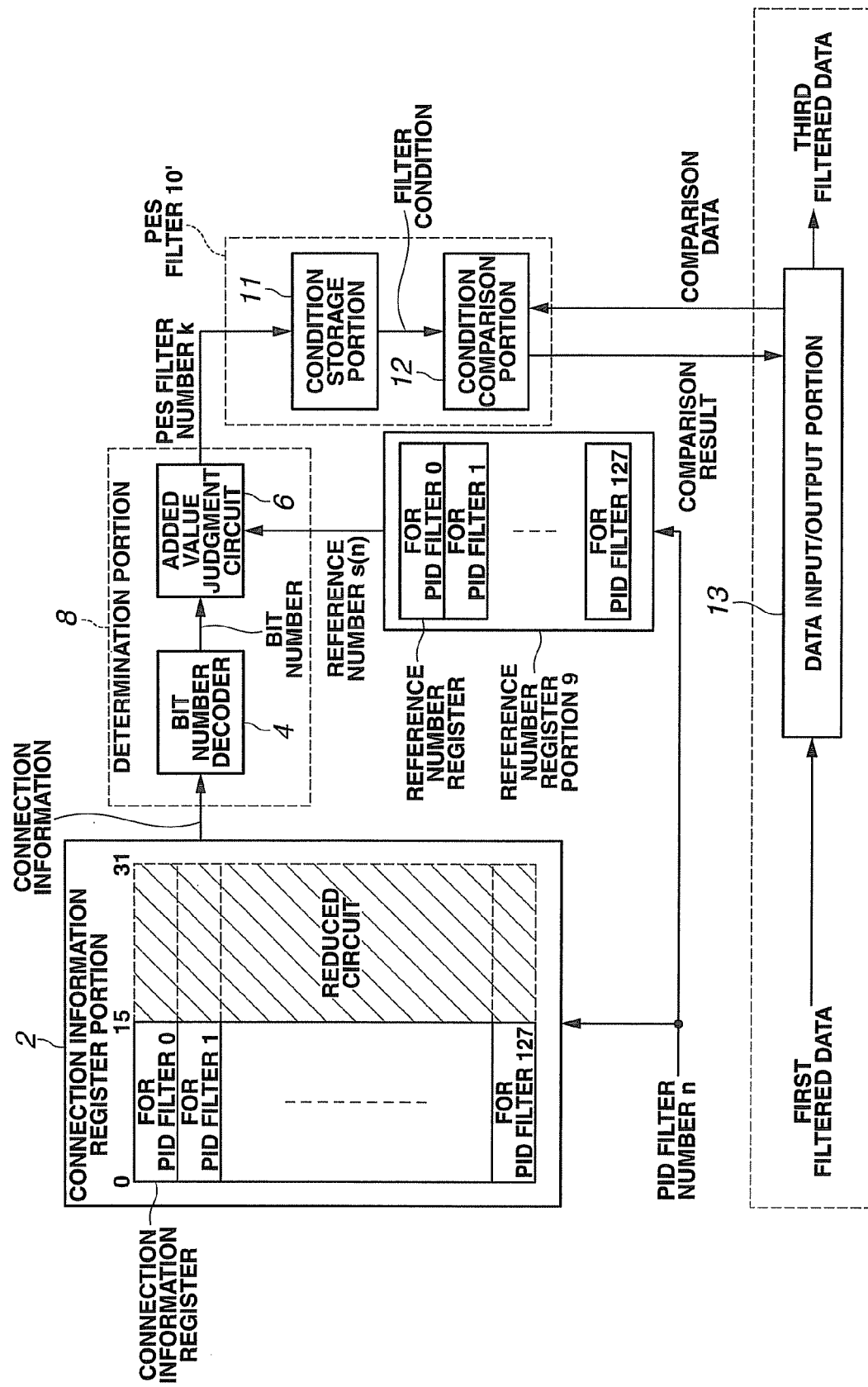
FIG. 19 is a block diagram showing a specific configuration of a PES filter portion 35 shown in FIG. 18 according to a fifth embodiment.

Although a fourth digital broadcast receiving apparatus in which a PES filter portion is incorporated into FIG. 1 will not be shown, the difference between the apparatus and FIG. 1 lies in the fact that, in addition to the filter portions of the PID filter portion 24 and the section filter portion 20, a PES filter portion 35 (an internal configuration thereof is shown in FIG. 19) is further provided.

For ease of understanding, a description will be given as an example using a case where the PES filter portion 35A is controlled by a receiving apparatus (or a filtering apparatus) in which the data input/output portion is constituted by a sub-processor or the like, such as the case of the second digital broadcast receiving apparatus shown in FIG. 16.

In addition to the functions of the data input/output portion 34, the data input/output portion 34A is provided with at least the following additional functions.

7. If the desired data is PES data, extracting information (at least any one of a stream number, a time stamp or the like) identifying the PES data and outputting the same as comparison data pe-dt to the PES filter portion 35A.

8. Receiving a comparison result pe-re outputted from the PES filter portion 35A and, in accordance to the value thereof, outputting a part at least including the video data, the audio data or the private data (corresponding to third filtered data) to the data bus 32.

FIG. 19 is a block diagram showing a specific configuration of a PES filter portion 35A (or 35) according to the fifth embodiment of the present invention which is to be applied to the filtering apparatus shown in FIG. 18. Like components to those shown in FIG. 2 are assigned like reference numerals. In the same manner as the difference between PID filter portions 24 and 24A and the difference between the section filters 20 and 20A, reference character 35A represents a configuration in which at least the data input/output portion 13 is not included in the PES filter portion 35.

The difference with FIG. 2 (first embodiment) lies in the fact that the part including the condition storage portion 11 and the condition comparison portion 12 has been changed to PES filter 10', and that a value outputted from the determination portion 9 is arranged to be inputted as a PES filter number k to the PES filter 10'.

In a single filtering apparatus or a receiving apparatus, the number of mounted PES filters is generally smaller (or equal to or smaller) than the number of mounted section filters. In consideration thereof, while the first embodiment and the like have been described using specific examples in which the number of mounted section filters is set to 128, the present embodiment (FIG. 19) will be described using a specific example in which the number of mounted PES filters is set to 32.

Therefore, while a conventional case requires that the capacity of a connection information register of each PID filter included in the connection information register portion 2 shown in FIG. 19 be set to at least 32 bits, by imposing the restriction of Formula 10 below, the required capacity is now ½ thereof or 16 bits (the shaded area of the connection information register portion 2 represents a total capacity part to be reduced).

$$s(n) \leq k < s(n)+16 \quad \text{(Formula 10)}$$

In other words, presented is a block diagram of a case where the quantity of PES filters connectable to one PID filter is restricted to 16.

For the purpose of reference, the data input/output portion 13 that is not required by the third digital broadcast receiving apparatus shown in FIG. 18 has been included. The data input/output portion 13 is at least provided with functions 7. and 8. which have been described above as functions of the data input/output portion 34A shown in FIG. 18.

In other words, information (a stream number or the like) identifying PES data is extracted from first filtered data; the information is outputted as comparison data to the condition comparison portion 12; and at the same time, in accordance with a comparison result inputted from the condition comparison portion 12, a part from the first filtered data which at least includes video data, audio data or private data is outputted as third filtered data to the data bus 32.

Since the same operations as in the first embodiment are performed at the other parts assigned like reference numerals to FIG. 2 and have already been described, descriptions thereof will be hereby omitted.

It is obvious that the PES filter portion shown in FIG. 19 can be incorporated into the fourth digital broadcast receiving apparatus, not shown, by configuring the part including the data input/output portion 13 as the PES filter portion 35 and disposing the same so that first filtered data and a PID filter number can be accepted from the PID filter portion 24 and, at the same time, third filtered data can be outputted to the data bus 32. The present invention includes the above-described configuration.

Furthermore, it is easily understandable that, as internal configurations of the PES filter portion 35A (or 35), a circuit configuration that enables a reference number to be set for each input port as is the case with the second embodiment shown in FIG. 12 or a circuit configuration that enables selection of reference numbers for either each input port or for each PID filter as is the case with the third embodiment shown in FIG. 15 can be realized by replacing "section filter" with "PES filter" in the descriptions of the respective embodiments presented above. The present invention includes all of these configurations.

In the same manner as the PID filter portion 24A (or 24) and the section filter portion 20A (or 20) shown in FIG. 16 (or FIG. 1), it is assumed that a filter condition to the condition storage portion included in the PES filter portion 35A (or 35) is set in advance (before commencing filtering of desired data) through a path, not shown, from the host processor 25, a path via the data input/output portion 34A, or the like.

As described above in the first to fifth embodiments, according to the present invention, an increase in circuit size of a connection information register which accompanies an increase in the number of mounted filters in a receiving apparatus or a filtering apparatus can be suppressed without impairing flexibility towards various broadcast modes.

In addition, numbers of section filters are now easily manageable as relative numbers from a reference number by a processor (also referred to as a microcomputer, a sequencer or the like) that controls the receiving apparatus or the filtering apparatus as exemplified by the host processor 25. Please refer to advantageous effects thereof which will be organized below.

The processor that provides control is not limited to a host processor. Control can also be provided by the sub-processor shown in FIG. 16 or by a separate processor, not shown, and the benefits from the present invention can be received in either case.

(Advantageous Effects of Reference Numbers)

Advantageous effects attributable to the introduction of reference numbers will now be described in greater detail.

For ease of understanding of the advantageous effects, a comparison will be drawn between Document 1.

While a processor generally requires software (also referred to as an application, firmware or the like) for operating the same, section filter management is processing premised on realization through software. The difference between Document 1 and processing according to the present invention will be described below using flowchart diagrams.

First, management of section filters by a processor which will be required by a filtering apparatus (or a receiving apparatus mounted therewith) according to Document 1 will be described.

In the same manner as in the description of the related art, a description of an example will be given using a case where a connection information register of 64 bits is allocated per one PID filter and a restriction of $n-31 < k \leq n+32$ is imposed between number n of PID filters and number k of section filters connectable thereto.

Figures 20A, 20B, 20C, 21:
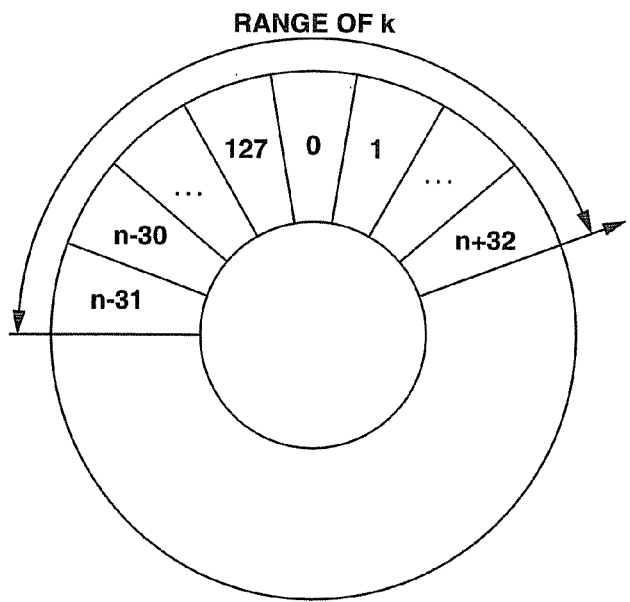
FIGS. 20A to 20C are diagrams showing a relationship between bit numbers and section filter numbers of a connection information register according to Document 1.
FIG. 21 is a diagram showing an example of a range of connectable section filters according to Document 1.

FIGS. 20A to 20C show a relationship between the number of bits (bit numbers) of a connection information register allocated to a PID filter and numbers of section filters (section filter numbers) connectable to the PID filter according to Document 1, and, as described above, present an example in which the connection information register is constituted by 64 bits from the 0th to 63rd bit and the number of mounted section filters is set to 128.

FIG. 20A represents a general form in which section filter numbers are allocated in ascending order as relative numbers from a PID filter number n to bit numbers of the connection information register. In other words, a section filter number (absolute number) may be calculated by adding/subtracting an offset value determined from a bit number of the connection information register to/from a PID filter number. FIG. 20B is an example where n=0, and FIG. 20C is an example where n=96.

In addition, efficient connection of unused section filters to PID filters can be achieved using the continuity of numbers shown in FIG. 21.

FIGS. 20A to 20C are diagrams corresponding to FIGS. 9A to 9C or to FIGS. 13A to 13C according to the present invention, while FIG. 21 is a diagram corresponding to FIG. 11 or FIG. 14 according to the present invention.

When actually controlling section filters from a processor (or software), an internal variable (an entity thereof is stored in a storage element such as a memory or a register) indicating whether a section filter of each number is in use (connected to any of the PID filters) is separately required. The bit length (capacity) of the variable is a number at least equal to the number of mounted section filters. For the sake of convenience, the storage element in which the internal variable is retained shall be referred to as a use confirmation register.

In addition to the inside of the processor, the use confirmation register can be disposed at any location in the filtering apparatus or the receiving apparatus including the section filter portion 20 or the memory 26 shown in FIG. 1 or in a block, not shown. The present invention does not limit the location of the use confirmation register.

Now, for example, as shown in FIGS. 22A to 22C, a use confirmation register having the same structure as a connection information register will be considered. Bit numbers are allocated to the use confirmation register in a sequence such that number 0 is allocated to the left-most bit in FIGS. 22A to 22C. The use confirmation register is used by a processor so that initial values of the respective bit values are set to "0", and when a section filter having the same number as a bit number is connected to any of the PID filters (when a section filter is used), the bit value of the number is changed to "1".

The present diagrams represent an example of a case where the number of mounted section filters is set to 64, wherein FIG. 22A shows an example of allocation in ascending order, FIG. 22B shows an example of allocation in descending order, and FIG. 22C shows an example of allocation in ascending order in which the 0th and 31st section filters are currently in use (connected).

This enables section filters in use to be grasped from bit numbers having a value of "1" and unused section filters to be grasped from bit numbers having a value of "0". Consequently, retrieval processing of section filters that are in use or are unused during the addition (connection) or deletion (cancelling connection) when the types of section data to be filtered increases or decreases can be simplified.

Although a bit number and a section filter number are associated at a connection information register in the same manner as at a use confirmation register, in Document 1, an absolute number of a section filter is determined by offsetting by a value indicated by a bit number from a number n of a PID filter. In other words, an absolute number of a section filter is indicated by a connection information register as a relative number from PID filter number n that is a connection source.

Consequently, when retrieving a section filter that is unused (or in use) at a PID filter of a given number, it is necessary to compare and judge a section filter number indicated by the connection information register with a number indicated by the use confirmation register.

FIGS. 23A and 23B are diagrams schematically showing how the comparison judgment processing is performed by software. FIG. 23A shows a state before fold-back processing (before comparison), while FIG. 23B shows a state after fold-back processing (after comparison).

In FIGS. 23A and 23B, upper levels respectively show states of a use confirmation register and lower levels respectively show states of a connection information register. FIGS. 23A and 23B represent an example of a case where the number of mounted section filters (a bit length of the use confirmation register) is set to 128 and the number of section filters connectable per one PID filter (a bit length of the connection information register) is set to 64.

In addition, for both registers, the number of section filters indicated by the number of each bit is arranged in ascending order from bit number 0. Numbers (absolute numbers) 0 to 127 are respectively allocated to the section filters, and a connection information register for the 0th PID filter is shown.

As shown in FIGS. 23A and 23B, at least section filters having numbers (absolute numbers) 0, 1, 32 and 127 are currently being used (connected to any of the PID filters), and section filters having numbers 0 and 97 are being used by (connected to) the PID filter number 0. In other words, the respective bit values of bit numbers 0, 1, 32 and 127 of the use confirmation register and bit numbers 0 and 31 of the connection information register are set to "1".

First, a shift operation is performed at either one of the registers so that the position of bits at which the use confirmation register and the connection information register indicate a same section filter number match each other.

FIGS. 23A and 23B represent a case where the connection information register is shifted. FIG. 23B is a result of shifting so that the respective bits indicating the section filter number 0 of the use confirmation register and the connection information register in FIG. 23A assume the same position.

When shifting to the left-hand side of the diagram (shifting to the left), the part of bit numbers 0 to 30 of the connection information register must be sequentially folded back from a left end to a right end thereof in order to match the part of bit numbers 0 to 36 of the connection information register to a part of bit numbers 97 to 127 of the use confirmation register.

Conversely, when shifting to the right-hand side of the diagram (shifting to the right), the part of bit numbers 32 to 63 of the connection information register must be sequentially folded back from a right end to a left end thereof in order to match the part of bit numbers 32 to 63 of the connection information register to a part of bit numbers 0 to 31 of the use confirmation register.

In other words, FIGS. 23A and 23B also represent an example where fold-back processing is performed during a shift operation.

After shifting as described above, values of both registers are compared in a state where bit positions match each other, and a determination of whether a section filter indicated by the bit number is in use can be made according to a combination of the values of both registers.

If a combination of a bit value of the use confirmation register and a bit value of the connection information register at the same bit position is:

(1,1), it can be determined that the section filter having a number indicated by the bit is connected to a current (number n) PID filter or, in other words, currently in use;

(1,0), it can be determined that the section filter having a number indicated by the bit is connected to another PID filter or, in other words, currently in use;

(0,0), it can be determined that the section filter having a number indicated by the bit is unused.

Note that (0,1) is an impractical value (in a strict sense, the value exists as a transitional value in a case where both registers cannot be completely simultaneously updated, but is impractical as a steady-state value).

As seen, by shifting the connection information register (or the use confirmation register) so that section filter number indicated by respective bit numbers match, performing fold-back processing as needed, and comparing the bit values of both registers at the same bit position, a determination can be made on whether the section filter is in use.

Figure 24:
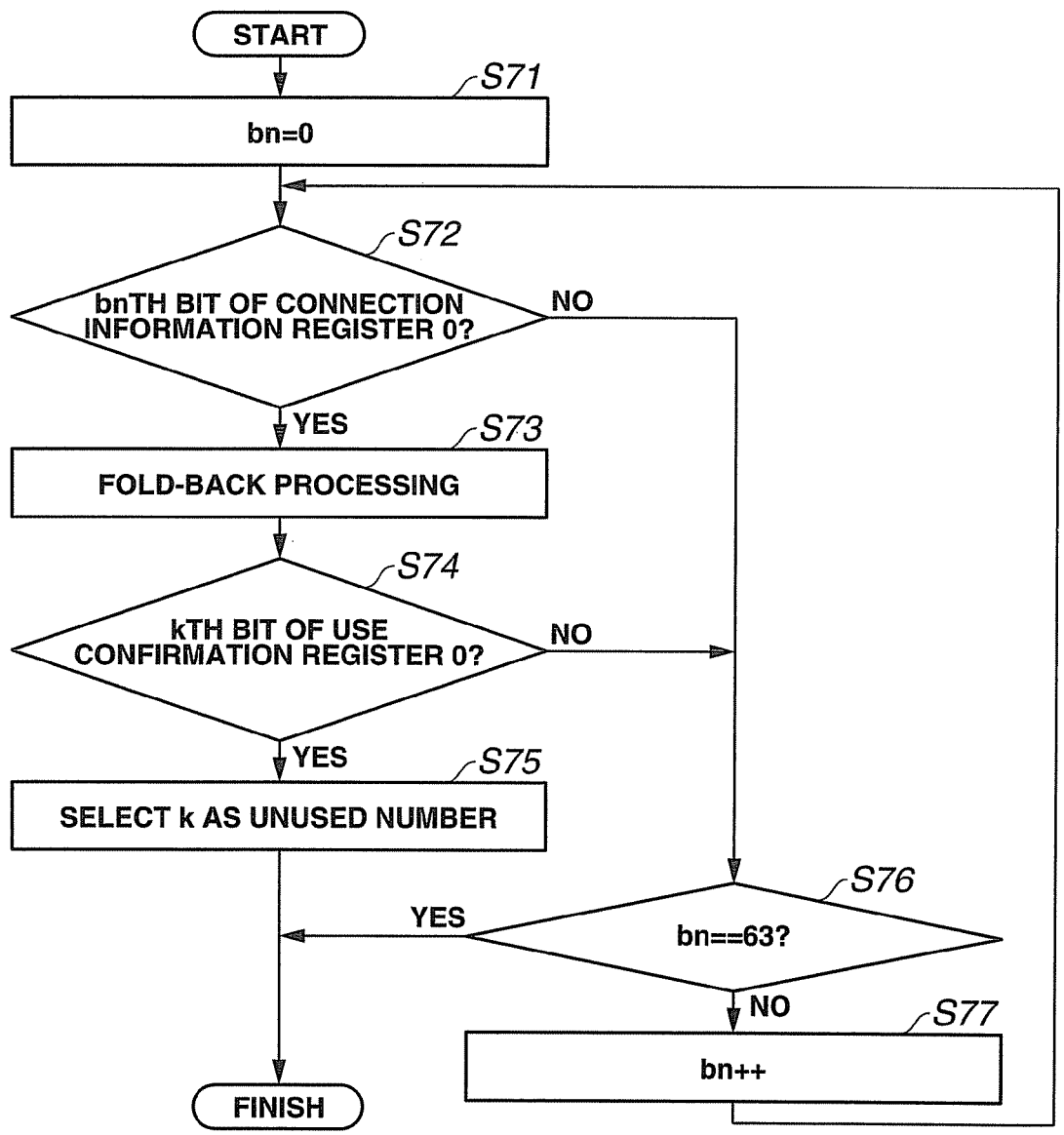
FIG. 24 is a flowchart showing retrieval processing an unused section filter using software according to Document 1.

FIG. 24 is a flowchart representation of retrieval processing of an unused section filter performed at the above-mentioned processor (or software). In the same manner as the example shown in FIGS. 23A and 23B described above, an example of a case where the bit length (capacity) of the connection information register is set to 64 bits is shown.

In step S71, bn indicating a bit number of a connection information register to perform retrieval processing is initialized to 0. Since the present diagram uses as an example a connection information register of 64 bits, bn may take values from 0 to 63.

In step S72, judgment is performed on whether the bit value of the bit number bn is "0".

Figure 25:
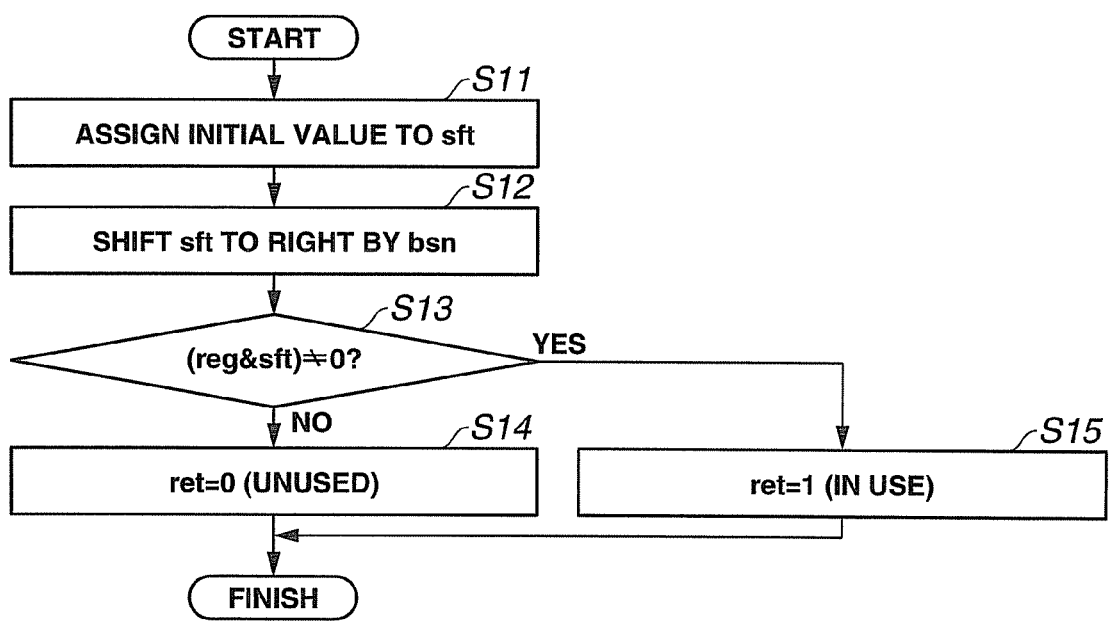
FIG. 25 is a flowchart specifically showing branch processing of steps S72 and S74.

FIG. 25 is a flowchart specifically showing branch processing of steps S72 and S74.

In step S11, an initial value is assigned to a shift value sft. The shift value is a numerical value that is "1" for only one bit value and is otherwise "0", and is a value that is used to identify the number of a bit at a certain position by counting how many shifts were required to move a "1" placed at the MSB (most significant bit) or the LSB (least significant bit) to an attention bit.

The bit length of sft must be at least equal to or greater than the bit length of reg (connection information register value or use confirmation register value) that is inputted in the present branch processing.

In the example shown in FIG. 25, on the assumption that a configuration of a storage element such as a register or a memory in which the shift value is retained is the same as that of the use confirmation register or the connection information register shown in FIGS. 23A and 23B, a value that is "1" for only the 0th bit and is otherwise "0" is assigned as the initial value of the shift value.

Therefore, in a case where reg is a 64-bit connection information register value (in a case where the present branch processing is performed in S72), the initial value of sft may be expressed in hexadecimal with the number 0 bit as the MSB and the number 63 bit as the LSB as "0x8000_0000_0000_0000", and in a case where reg is a 128-bit use confirmation register value (in a case where the present branch processing is performed in S74), the initial value of sft may be similarly expressed as "0x8000_0000_0000_0000_0000_0000_0000_0000".

"0x" is a prefix indicating that a subsequent numerical value is given in hexadecimal, and an underbar "_" is inserted every 16 bits in the notation so that it is easily understood that the numerical value is 64 bits or 128 bits.

In step S12, the shift value sft is shifted to the right (to the LSB side) by the same number of bits as the value indicated by a shift amount bsn.

For example, when the initial value of sft is "0x8000_0000_0000_0000", a shift to the right by 15 bits changes sft to "0x0001_0000_0000_0000", and a shift to the right by 60 bits changes sft to "0x0000_0000_0000_0008".

As bsn, in S72, the value of a bit number bn currently being retrieved is passed (assigned), while in S74, the value of a section filter number k (absolute number) determined in S73 is passed (assigned).

In step S13, based on the value indicated by reg, determination is made on whether a bit having the same number as the bit for which sft has changed after shifting to "1" is "1". This can be determined by calculating a logical AND of reg and sft after shifting, and verifying whether the result thereof is 0.

As reg, in S72, the value of the connection information register is passed (assigned), while in S74, the value of the use confirmation register is passed (assigned).

A result of the logical AND of "0" indicates that the value of a bit at the same position (or same number) as the bit for which sft has changed after shifting to "1" is "0" for reg. In other words, the result indicates that, at the connection information register or the use confirmation register, the section filter of the number indicated by the bit number is unused (or unconnected).

A result of the logical AND other than "0" indicates that the value of a bit at the same position (or same number) as the bit for which sft has changed after shifting to "1" is also "1" for reg. This means that the result indicates that, at the connection information register or the use confirmation register, the section filter of the number indicated by the bit number is in use (or is connected).

In steps S14 and S15, the result of the logical AND (S13) is reflected on ret that is a return value (value to be notified) to an upper level flow (FIG. 24) of the present branch processing.

In the example shown in FIG. 25, as a notification to the upper level flow (S72 or S74 in FIG. 24), "1" is assigned to ret if in use and "0" is assigned to ret if unused. S72 and S74 branch to the "YES" side if the return value is "0" and to the "NO" side if the return value is "1".

Therefore, in S72, when additionally connecting a section filter to a PID filter, processing is performed to determine whether a section filter of a specified number (a relative number from the PID filter number) among the section filters connectable to the PID filter is currently connected (in use). When the section filter is unconnected (unused), S72 branches to S73 (YES side), and when connected (in use), S72 branches to S76 (NO side).

In step S73, when a number k (absolute number) of a section filter that is unconnected is calculated from a bit number bn and a PID filter number n, fold-back processing is performed as needed.

Processing corresponding to the shift operations to the right or to the left shown in FIGS. 23A and 23B is included in S73.

In step S74, flow processing shown in FIG. 25 is executed in the same manner as in S72. As for the flow processing, other than the fact that a use confirmation register value is handed to reg and the section filter number k determined in S73 is handed to bn, there is no difference from a case where the processing is executed in S72. Thus, since a description has already been given, a description will be hereby omitted.

Therefore, the processing of S74 is performed so as to determine whether the section filter of the number (absolute number) determined in S73 is in use (connected) at another PID filter. If the section filter is unused (unconnected), S74 branches to S75 (YES side), and when in use (connected), S74 branches to S76 (NO side).

In step S75, the number determined in S73 is selected as the absolute number of a section filter connectable (unused at other PID filters as well) to the PID filter that is a target of the current retrieval processing, and is notified to an upper level flow.

In step S76, determination is made on whether a verification of nonuse has been performed in the current retrieval processing on section filters whose quantity corresponds to the number of bits of the connection information register (all section filters connectable to a given PID filter number). In the present example, since the number of bits of the connection information register is set to 64 bits (the number of section filters connectable per one PID filter is 64) and the initial value of bn is set to 0, the determination can be made by checking whether bn has already been counted to 63.

If the value of bn is 63, S76 branches to finish (YES side), and if not 63, S76 branches to S77 (NO side).

When the flow branches to finish at S76, a notification must be made to the upper level flow to the effect that the number of an unused section filter could not be detected. However, in order to distinguish from a case where the flow finishes via S75, in the case where an unused section filter could not be detected, notification may be made using a value that does not exist as a section filter number (in the present example, a value other than 0 to 127 such as 256) as the detected number, or a notification on "whether detected or not" may be made separately using a variable separate from the detected number.

In step S77, the value of bn is incremented by 1 in order to advance the retrieval processing to a next bit, and the flow returns to S72.

As described above, retrieval of unused section filters is performed in section filter management by a processor. While the operation is performed at regular intervals (at a minimum, at intervals of about once every several 10 ms) as long as the receiving apparatus continues to receive a digital broadcast, according to Document 1, the fold-back processing included in step S73 must be performed as necessary every time the operation is performed. Consequently, there is a problem in that processing becomes complicated.

Next, a description will be given on the management of section filters by a processor in a filtering apparatus (or a receiving apparatus mounted therewith) to which the present invention is applied.

While a use confirmation register is also required in the present invention, the difference from Document 1 lies in the fact that the use confirmation register is divided and used in accordance with the quantity of reference numbers to be specified (retained in a reference number register).

For ease of understanding, a description will be given of an example using a case where reference numbers are specified according to input ports. In other words, as shown in the second embodiment, a case where a reference number s(x) is retained for each input port x will be used as an example. In the case of the first embodiment, an equivalent operation can be realized by arranging all of the reference numbers s(n) of PID filters n to be connected to the same input port to be the same.

An example of division of a use confirmation register is shown in FIGS. 26A to 26C. FIG. 26A represents a method of use according to Document 1 and shows a use confirmation register that retains at least the same number of bits (capacity) as the number of mounted section filters prior to division; FIG. 26B represents a method of use according to the present invention and shows an example of division where the number of mounted input ports is 2; and FIG. 26C represents a method of use according to the present invention and shows an example of division where the number of mounted input ports is 4.

While a use confirmation register is used in Document 1 without division in the state shown in FIG. 26A, the present invention differs therefrom in that a use confirmation register is divided and used in accordance with the quantity of retained reference numbers as shown in FIGS. 26B and 26C.

While division is to be performed either logically or physically, only division is performed. Therefore, according to the present invention, section filter management can be performed at a use confirmation register in a state where the circuit size thereof is precisely the same as that of Document 1.

Generally, when executing software by a processor, one or more storage elements referred to as general-purpose registers are used. However, there are many cases where the capacity of one general-purpose register is smaller than the capacity of a use confirmation register or a connection information register exemplified in the above descriptions, such as in the cases of 16 bits, 32 bits and 64 bits. In such cases, from a software perspective, a variable will be handled by dividing into two or more variables. For example, when it is necessary to handle a variable A having a total number of bits of 128 bits, the variable A must be managed by dividing into, for example, variables A0, A1, A2 and A3 which are each 32 bits in order to allow handling by a 32-bit general-purpose register. However, in order to avoid any misunderstanding, it should be added that the term "division" as used above does not signify a division of a variable necessitated by processor specification. Instead, an action of dividing (identifying) parts to be used for each reference number is expressed as "division".

Returning now to FIG. 26B, it is shown that: the number of section filters connectable to a PID filter to be connected to input port number 0 is arranged to be 64 and the section filters are given absolute numbers of 0 to 63, wherein section filter management is performed on the respective section filters by using a bit part (reg_u(0)) of the use confirmation register whose bit absolute numbers are 0 to 63; and that the number of section filters connectable to a PID filter to be connected to input port number 1 is arranged to be 64 and the section filters are given absolute numbers of 64 to 127, wherein section filter management is performed on the respective section filters by using a bit part (reg_u(1)) of the use confirmation register whose bit absolute numbers are 64 to 127.

In other words, the example hereby presented is a division premised on management performed by respectively specifying 0 as the reference number s(0) of the input port number 0 and 64 as the reference number s(1) of the input port number 1.

FIG. 26C shows that: the number of section filters connectable to a PID filter to be connected to input port number 0 is arranged to be 32 and the section filters are given absolute numbers of 0 to 31, wherein section filter management is performed on the respective section filters by using a bit part (reg_u(0)) of the use confirmation register whose bit absolute numbers are 0 to 31;

the number of section filters connectable to a PID filter to be connected to input port number 1 is arranged to be 32 and the section filters are given absolute numbers of 32 to 63, wherein section filter management is performed on the respective section filters by using a bit part (reg_u(1)) of the use confirmation register whose bit absolute numbers are 32 to 63;

the number of section filters connectable to a PID filter to be connected to input port number 2 is arranged to be 32 and the section filters are given absolute numbers of 64 to 95, wherein section filter management is performed on the respective section filters by using a bit part (reg_u(2)) of the use confirmation register whose bit absolute numbers are 64 to 95; and that the number of section filters connectable to a PID filter to be connected to input port number 3 is arranged to be 32 and the section filters are given absolute numbers of 96 to 127, wherein section filter management is performed on the respective section filters by using a bit part (reg_u(3)) of the use confirmation register whose bit absolute numbers are 96 to 127.

In other words, the example presented is a division premised on management performed by respectively specifying: 0 as the reference number s(0) of the input port number 0; 32 as the reference number s(1) of the input port number 1; 64 as the reference number s(2) of the input port number 2; and 96 as the reference number s(3) of the input port number 3.

At this point, in the same manner as in Document 1, the present invention requires that, when retrieving a section filter that is unused (or in use) at a PID filter to be connected to an input port having a given number, a comparison and judgment be performed on a section filter number indicated by the connection information register and a number indicated by the use confirmation register.

Figure 27A:
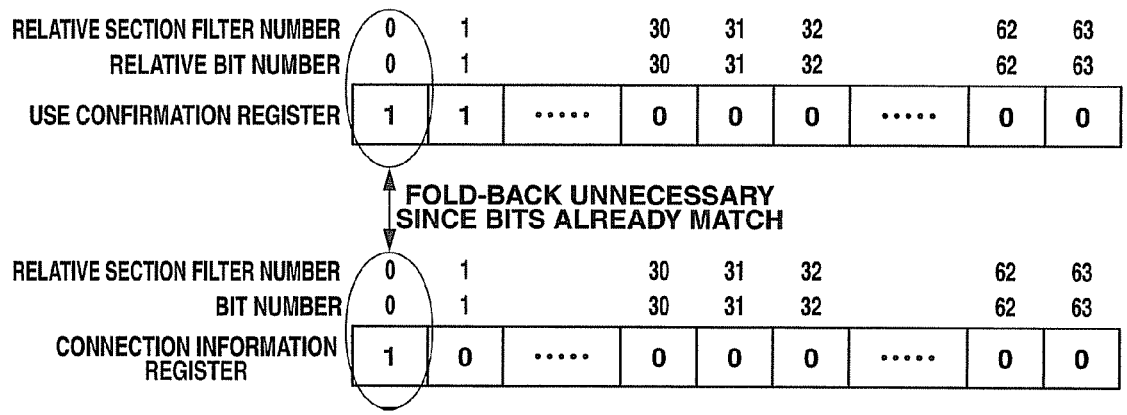
FIGS. 27A and 27B are diagrams schematically showing processing for retrieving an unused section filter according to the present invention.
Figure 27B:
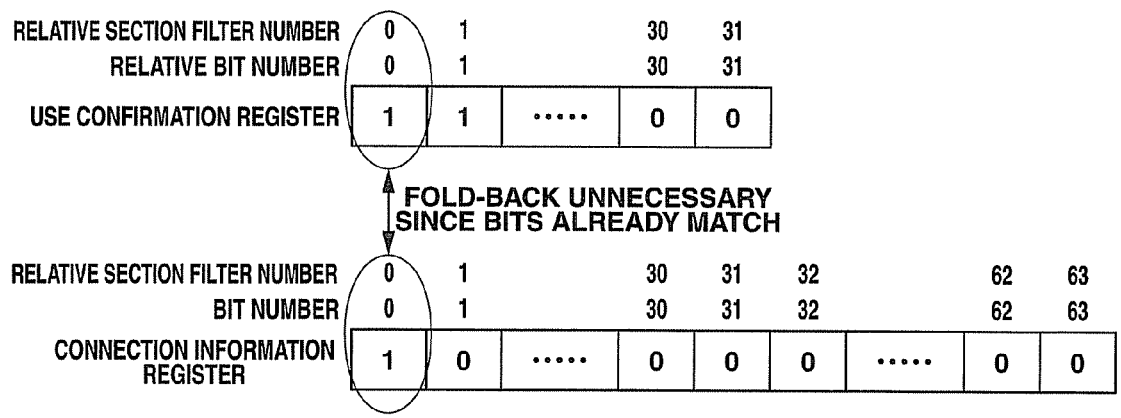

FIGS. 27A and 27B are diagrams schematically showing how the comparison judgment processing is performed by software. FIG. 27A shows a state in which the use confirmation register after division is 64 bits (corresponding to FIG. 26B), while FIG. 27B in which the use confirmation register after division is 32 bits (corresponding to FIG. 26C).

In FIGS. 27A and 27B, upper levels respectively show states of a use confirmation register and lower levels respectively show states of a connection information register. FIGS. 27A and 27B represent an example of a case where the number of mounted section filters (a bit length of the use confirmation register) is set to 128 and the number of section filters connectable per one PID filter (a bit length of the connection information register) is set to 64.

In addition, for both registers, the number of section filters indicated by the number of each bit is arranged in ascending order from bit number 0. Relative numbers from a reference number are respectively allocated to the section filters, and a connection information register for the 0th PID filter to be connected to the input port number 0 is shown.

As shown in FIGS. 27A and 27B, at least section filters having numbers (relative numbers) 0 and 1 are currently being used, and a section filter having number 0 is being used by (connected to) the PID filter number 0. In other words, the respective bit values of bit numbers 0 and 1 of the use confirmation register and bit number 0 of the connection information register are set to "1".

Consequently, determination of whether in use can be made without having to perform shifting or fold-back processing as is the case in Document 1 (FIGS. 23A and 23B) by comparing values of both registers while preserving the current states and from a combination of the values of both registers. Since the method of judgment is the same as that of Document 1 (the method described in FIGS. 23A and 23B), a description thereof will be hereby omitted.

Figure 28:
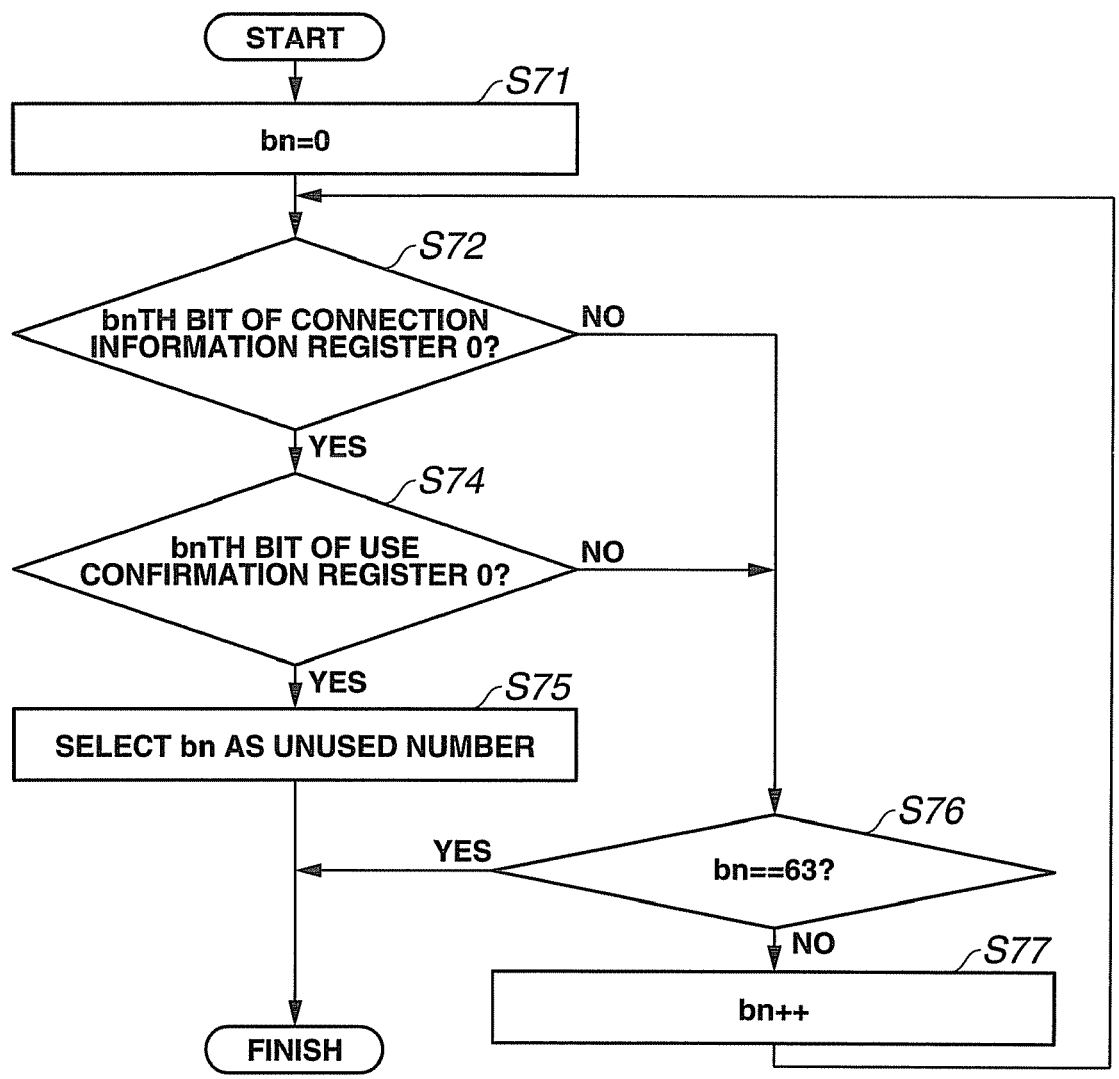
FIG. 28 is a flowchart showing retrieval processing of an unused section filter using software according to the present invention.

FIG. 28 is a flowchart representation of retrieval processing of an unused section filter performed at the above-mentioned processor (or software). In the same manner as the example shown in FIGS. 27A and 27B described above, an example of a case where the bit length (capacity) of the connection information register is set to 64 bits is shown.

Steps in which is performed the same processing as shown in FIG. 24 are assigned like reference characters, and detailed descriptions thereof will be hereby omitted.

As shown in FIG. 28, the difference from FIG. 24 is that step S73 has been omitted.

In other words, in the case where a notification is forwarded from the lower level flow shown in FIG. 25 to the effect that the bit value of a connection information register of a bit number indicated by bn in step S72 is "0" or, in other words, that the section filter indicated by the number is unconnected to a target PID filter, the flow branches to the YES side and step S74 is next executed.

In step S74, bn is handed to bsn of the lower level flow shown in FIG. 25 as a number (relative number) of an unused section filter. As a result of processing by the lower level flow, when a notification is forwarded therefrom to the effect that the number bn section filter is unused, the flow branches to the YES side.

In step S75, the section filter of the number (bn) used in S72 (or S74) is selected as being unused.

Although not illustrated, setting a reference number in an upper level flow that is further above the processing shown in FIG. 28 shall suffice. For example, setting need only to be performed once when, for example, commencing broadcast reception by a receiving apparatus. While it is obvious that changes can be made on a regular basis, normally, once a broadcast (for example, a domestic digital broadcast or a European digital broadcast) to be received is determined, the degree of flexibility to be provided with respect to the broadcast is substantially decided. Thus, it is conceivable that no changes will be required at least during playback or recording of a program.

In other words, FIG. 28 shows that a reference number need not be set every time a retrieval of an unused section filter is performed.

As described above, according to the present invention, when section filter management is performed by a processor (or software), by setting a reference number in advance (for example, upon commencing broadcast reception), section filters can be managed thereafter using relative numbers from the reference number without being concerned about reference numbers.

Consequently, fold-back processing (corresponding to step S73 in FIG. 24) becomes unnecessary, thereby providing an advantage that processing can be simplified.

In further addition, in Document 1, fold-back processing is respectively required at a section filter portion (for example, the section filter portion 20 shown in FIG. 1) and a processor. Conversely, in the present invention, fold-back processing is only required at a section filter portion, and fold-back processing is concealed by management performed by a processor using relative numbers from a reference number. As a result, fold-back processing becomes unnecessary.

Therefore, as described with respect to the first to fifth embodiments and the advantageous effects of reference numbers, according to the present invention, an increase in the circuit size of a connection information register can be suppressed without impairing flexibility towards various broadcast modes, and further, management of section filters by a processor (software) becomes simpler.

Lastly, while the above descriptions have been given using specific examples with respect to various attainable values for ease of understanding, the present invention is by no means merely limited to these specific examples. Such unlimited specific examples will be listed below as a supplementary explanation of the fact that the present invention is capable of accommodating various values. Even if not listed below, values may assume various ranges not merely limited to the values in the above specific examples as long as such values remain in the scope of the claims, and the present invention includes all such values.

1. While descriptions have been given by allocating consecutive integers starting from 0, e.g., 0 to 127, as numbers (absolute numbers) for uniquely identifying one or more entities included in (mounted on) a receiving apparatus or a filtering apparatus such as PID filter numbers, section filter numbers, input port numbers or bit numbers, the present invention is not limited to such number allocation. Instead, arbitrary integers or real numbers may be used. Furthermore, it is not always necessary to allocate numbers that are incremented by 1, and specific numbers capable of identifying each other shall suffice, such as numbers incremented by 2 or numbers lacking regularity, whereby the present invention includes such numbers.

2. While descriptions have been given in which, with respect to polarities of bit values used when judging either an in-use state or an unused state depending on values of the connection information register and the use confirmation register, "1" is assumed to represent an in-use (connected) state and "0" is used to represent an unused (unconnected) state, the present invention is not limited to these polarities. Instead, "0" may be assumed to represent an in-use (connected) state and "1" may be used to represent an unused (unconnected) state, and the present invention includes such an arrangement.

3. While descriptions have been given on an example of a bit configuration in which, when expressing either an in-use state or an unused state at the connection information register and the use confirmation register, a state of one section filter is expressed by 1 bit, the present invention is not limited to this configuration. Instead, a bit configuration in which a state of one section filter is expressed by 2 or more bits is also possible and is included in the present invention.

In this case, in the same manner as the polarities described above, the values indicating an in-use state (connected) and an unused state (unconnected) are not necessarily limited to "0" and "1" and can be indicated using various values (numerical values). For example, in a case of a notation in 4 bits, an in-use state may be expressed as "0x0" and an unused state may be expressed as "0xF", and the present invention includes such expressions.

It should be understood that the bit configuration of the use confirmation register does not affect the present invention. This is because, as already described with respect to the advantageous effects of reference numbers, the fold-back processing in step S73 shown in F24 is responsible for complicating section filter management by a processor (software). While the processing is required when determining a section filter number from a connection information register, as is apparent from FIGS. 24 and 28, the processing is not required in step S74 in which a determination is made from a use confirmation register on whether a section filter number obtained in step S72 or step S73 is in use or is unused, or in subsequent steps.

In other words, regardless of the configuration of the use confirmation register, advantageous effects of the present invention are not affected.

Therefore, the connection information register and the use confirmation register need not have the same bit configuration as is the case in the descriptions given above, and may have configurations that differ from each other, whereby the present invention includes such configurations.

For example, it is possible to provide the connection information register with a bit configuration in which a state of one section filter is expressed by 1 bit, and provide the use confirmation register with a bit configuration in which a state of one section filter is expressed by 8 bits.

In the case of such a multi-bit configuration, a determination of either an in-use state or an unused state can also be made by, when in use, setting the value of the use confirmation register to the value of a connection source PID filter number, and when unused, setting the value of the use confirmation register to a number that does not exist as a PID filter number.

4. When allocating reference numbers, a maximum number (a capacity of the connection information register) of connectable section filters can be changed for each input port or each PID filter to which each reference number is to be set by separately providing a variable (or a memory, a register or the like), whereby the present invention includes such an arrangement.

For example, the restriction expressed by Formula 8 below can be imposed between a number n PID filter and a number k of the section filter connectable thereto:

$$s(n) \leq k < s(n)+j(n) \quad \text{(Formula 8); or}$$

the restriction expressed by Formula 9 below can be imposed between a number x input port and a number k of a section filter connectable to a number n PID filter to be connected thereto:

$$s(x) \leq k < s(x)+j(x) \text{ or}$$

$$s(x) \leq k < s(x)+j(n) \quad \text{(Formula 9)},$$

where j(n) and j(x) denote quantities of connectable section filters defined as variables of a PID filter number n or an input port number x, and which represent that different values can be set according to the numbers.

Even in a case where the maximum number (the capacity of the connection information register) of connectable section filters to each input port or each PID filter to which is set each reference number is fixed (constant), management can be performed by the processor as a filtering apparatus in which section filters whose quantity is equal to or less than the connectable maximum number indicated by the connection information register using a method described below.

Figure 29:
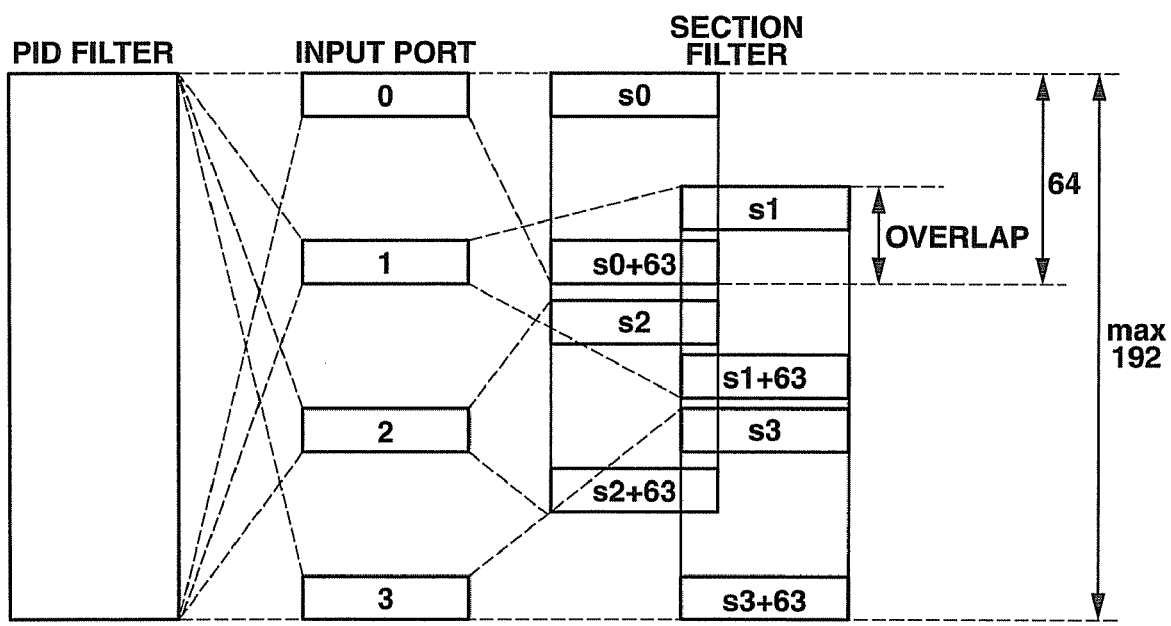
FIG. 29 is a diagram schematically showing an example of a reference number allocation method according to the present invention.

FIG. 29 is a diagram schematically showing possibilities offered by the management. For ease of understanding, as an example, a description will be given on a case where reference numbers can be set for each input port number as is the case with the filtering apparatus exemplified by the second embodiment.

In FIG. 29: a total of 64 section filters from s(0) to s(0)+63 are set to be connectable to a PID filter to be connected to the number 0 input port;

a total of 64 section filters from s(1) to s(1)+63 are set to be connectable to a PID filter to be connected to the number 1 input port;

a total of 64 section filters from s(2) to s(2)+63 are set to be connectable to a PID filter to be connected to the number 2 input port; and a total of 64 section filters from s(3) to s(3)+63 are set to be connectable to a PID filter to be connected to the number 3 input port.

As shown, overlapping parts may exist among the numbers of connectable section filters.

In this case, 64 section filters from a reference number do not invariably become usable only at the PID filter that is the connection possibility source and become unusable at other PID filters. Instead, by overlapping and arranging such parts to be unused at a PID filter to be connected to any of (or either of) the input ports through section filter management performed by the processor, a number that is smaller than the maximum connectable number can be efficiently allocated to each PID filter (or input port).

For instance, as shown in FIG. 29, in a case where the number of mounted section filters is 192 (max. 192), by assuming that s(0)=0, s(1)=48, s(2)=96, and s(3)=144, and by performing management so that: section filters number 48 to 63 which overlap with a PID filter to be connected to the input port 1 are not used (connected) by a PID filter to be connected to the input port 0; section filters number 96 to 111 are similarly not used (connected) by a PID filter to be connected to the input port 1; section filters number 144 to 159 are similarly not used (connected) by a PID filter to be connected to the input port 2; and section filters number 0 to 15 are similarly not used (connected) by a PID filter to be connected to the input port 3, it is now possible to use a PID filter to be connected to each input port as though 48 section filters are allocated to the PID filter.

s(x) is a reference number with respect to input port number x. In the diagram, due to limitations of space, reference numbers are shown with their parentheses omitted as s0, s1, s2, s3 and the like.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A filtering apparatus comprising:
at least one or more first filters assigned mutually different respective first filter numbers and used for first filtering to filter, from inputted packets, all or a part of the packets having a predetermined identifier;
at least one or more connection information registers disposed in correspondence with the first filters and which are configured to retain information having a predetermined number of bits;
at least one or more second filters assigned mutually different respective second filter numbers and used for second filtering to further filter, from all or a part of the packets filtered using the first filters, a data part of all or a part of the packets;
a condition storage portion configured to store at least one or more types of filter conditions for identifying the data part associated to the second filters;
one or more reference number registers configured to allocate an arbitrary number of the second filter numbers as a reference number to each of the first filter numbers and to store the each first filter number and the reference number allocated to each first filter number while associating the each first filter number with the reference number; and
a determination portion configured to determine the second filter numbers to be used for the second filtering based on the reference number and values of the connection information registers corresponding to the first filters.

2. The filtering apparatus according to claim 1, wherein the determination portion is configured to newly determine the second filter number further using a predetermined offset value when the second filter number determined based on the reference number and a value of the connection information register corresponding to the first filter is smaller than a predetermined minimum number or greater than a predetermined maximum number.

3. The filtering apparatus according to claim 1, wherein the determination portion is configured to determine the second filter number by performing addition/subtraction on the reference number and a value of the connection information register.

4. The filtering apparatus according to claim 1, comprising a use confirmation register configured to store a value indicating use or nonuse of the second filter for each of the second filter numbers, wherein
use or nonuse of the second filter is judged by comparing a value of the connection information register with a value of the use confirmation register.

5. A digital broadcast receiving apparatus comprising:
a demodulation portion configured to perform demodulation processing on received stream data and to output the same as a packet;
the filtering apparatus according to claim 1 which is configured to accept the packet as an input;
an output portion configured to output all or a part of the packets filtered by the filtering apparatus using the first filter or all or a part of the packets filtered by the filtering apparatus using the second filter; and
a processor configured to perform various processing using all or a part of the packets outputted from the output portion.

6. A filtering apparatus comprising:
at least one or more first filters assigned respective first filter numbers and used for first filtering to filter, from inputted packets, all or a part of the packets having a predetermined identifier;
at least one or more connection information registers disposed in correspondence with the first filters and which are configured to retain information having a predetermined number of bits;
at least one or more second filters assigned respective second filter numbers and used for second filtering to further filter, from all or a part of the packets filtered using the first filters, a data part of all or a part of the packets;
a condition storage portion configured to store at least one or more types of filter conditions for identifying the data part associated to the second filters;
at least one or more reference number registers configured to allocate any one of all of the second filter numbers as a reference number to each of the first filter numbers and to store the reference number; and
a determination portion configured to determine, for the second filtering, the second filter numbers in a range specified by the connection information registers using the reference number as a reference, wherein
each bit in the connection information register has either selection information or non-selection information, and
the determination portion is configured to determine the second filter number based on a position of a bit having the selection information, and the reference number or the first filter number.

7. The filtering apparatus according to claim 6, wherein the determination portion is configured to newly determine the second filter number further using a predetermined offset value when the second filter number determined based on a position of a bit having the selection information and the reference number or the first filter number is smaller than a predetermined minimum number or greater than a predetermined maximum number.

8. A filtering apparatus comprising:
at least one or more first filters used for first filtering to filter all or part of packets having a predetermined identifier from packets inputted from at least one or more input ports assigned mutually different respective input port numbers;
at least one or more connection information registers disposed in correspondence with the first filters and which are configured to retain information having a predetermined number of bits;
at least one or more second filters assigned mutually different respective second filter numbers and used for second filtering to further filter, from all or a part of the packets filtered using the first filters, a data part of all or part of the packets;
a condition storage portion configured to store at least one or more types of filter conditions for identifying the data part associated to the second filters;
one or more reference number registers configured to allocate an arbitrary number of the second filter numbers as a reference number to each of the input port numbers and to store the each input port number and the reference number allocated to the each input port number while associating the each input port number with the reference number; and a determination portion configured to determine the second filter numbers to be used for the second filtering based on the reference number and values of the connection information registers corresponding to the first filters.

9. The filtering apparatus according to claim 8, wherein the determination portion is configured to newly determine the second filter number further using a predetermined offset value when the second filter number determined based on the reference number and a value of the connection information register corresponding to the first filter is smaller than a predetermined minimum number or greater than a predetermined maximum number.

10. The filtering apparatus according to claim 8, wherein the determination portion is configured to determine the second filter number by performing addition/subtraction on the reference number and a value of the connection information register.

11. The filtering apparatus according to claim 8, comprising
a use confirmation register configured to store a value indicating use or nonuse of the second filter for each of the second filter numbers, wherein
use or nonuse of the second filter is judged by comparing a value of the connection information register with a value of the use confirmation register.

12. A digital broadcast receiving apparatus comprising:
a demodulation portion configured to perform demodulation processing on received stream data and to output the same as a packet;
the filtering apparatus according to claim 8 which is configured to accept the packet as an input;
an output portion configured to output all or a part of the packets filtered by the filtering apparatus using the first filter or all or a part of the packets filtered by the filtering apparatus using the second filter; and
a processor configured to perform various processing using all or a part of the packets outputted from the output portion.

13. A filtering apparatus comprising:
at least one or more first filters used for first filtering to filter all or part of packets having a predetermined identifier from packets inputted from at least one or more input ports assigned respective input port numbers;
at least one or more connection information registers disposed in correspondence with the first filters and which are configured to retain information having a predetermined number of bits;
at least one or more second filters assigned respective second filter numbers and used for second filtering to further filter, from all or a part of the packets filtered using the first filters, a data part of all or part of the packets;
a condition storage portion configured to store at least one or more types of filter conditions for identifying the data part associated to the second filters;
at least one or more reference number registers configured to allocate any one of all of the second filter numbers as a reference number to each of the input port numbers and to store the reference number; and
a determination portion configured to determine, for the second filtering, the second filter numbers in a range specified in the connection information registers using the reference number as a reference, wherein
each bit in the connection information register has either selection information or non-selection information, and the determination portion is configured to determine the second filter number based on a position of a bit having the selection information, and the reference number or the first filter number.

14. The filtering apparatus according to claim 13, wherein the determination portion is configured to newly determine the second filter number further using a predetermined offset value when the second filter number determined based on a position of a bit having the selection information and the reference number or the first filter number is smaller than a predetermined minimum number or greater than a predetermined maximum number.

15. A filtering apparatus comprising:
at least one or more input ports assigned mutually different respective input port numbers;
at least one or more first filters assigned mutually different respective first filter numbers and used for first filtering to filter, from packets inputted from the input port, all or part of the packets having a predetermined identifier;
at least one or more connection information registers disposed in correspondence with the first filters and which are configured to retain information having a predetermined number of bits;
at least one or more second filters assigned mutually different respective second filter numbers and used for second filtering to further filter, from all or a part of the packets filtered using the first filters, a data part of all or a part of the packets;
a condition storage portion configured to store at least one or more types of filter conditions for identifying the data part associated to the second filters;
one or more reference number registers configured to allocate an arbitrary number of the second filter number as a reference number to each of the first filter numbers, to store the each first filter number and the reference number allocated to the each first filter number while associating the each first filter number with the reference number, and store the each input port number and the reference number allocated to the each input port number while associating the each input port number with the reference number; and
a determination portion configured to determine the second filter numbers to be used for the second filtering based on the reference number and values of the connection information registers corresponding to the input ports of the first filters.

16. The filtering apparatus according to claim 15, wherein the determination portion is configured to newly determine the second filter number further using a predetermined offset value when the second filter number determined based on the reference number and a value of the connection information register corresponding to the first filter is smaller than a predetermined minimum number or greater than a predetermined maximum number.

17. The filtering apparatus according to claim 15, wherein the determination portion is configured to determine the second filter number by performing addition/subtraction on the reference number and a value of the connection information register.

18. The filtering apparatus according to claim 15, comprising
a use confirmation register configured to store a value indicating use or nonuse of the second filter for each of the second filter numbers, wherein
use or nonuse of the second filter is judged by comparing a value of the connection information register with a value of the use confirmation register.

19. A filtering apparatus comprising:

at least one or more input ports assigned respective input port numbers;

at least one or more first filters assigned respective first filter numbers and used for first filtering to filter, from packets inputted from the input port, all or part of the packets having a predetermined identifier;

at least one or more connection information registers disposed in correspondence with the first filters and which are configured to retain information having a predetermined number of bits;

at least one or more second filters assigned respective second filter numbers and used for second filtering to further filter, from all or a part of the packets filtered using the first filters, a data part of all or a part of the packets;

a condition storage portion configured to store at least one or more types of filter conditions for identifying the data part associated to the second filters;

at least one or more reference number registers configured to allocate any one of all of the second filter number as a reference number to each of the first filter numbers and each of the input port numbers and to store the reference number; and a determination portion configured to determine, for the second filtering, the second filter numbers in a range specified by the connection information registers using the reference number as a reference, wherein each bit in the connection information register has either selection information or non-selection information, and the determination portion is configured to determine the second filter number based on a position of a bit having the selection information, and the reference number or the first filter number.

20. The filtering apparatus according to claim 19, wherein the determination portion is configured to newly determine the second filter number further using a predetermined offset value when the second filter number determined based on a position of a bit having the selection information and the reference number or the first filter number is smaller than a predetermined minimum number or greater than a predetermined maximum number.

* * * * *